(12) United States Patent
Moon et al.

(10) Patent No.: US 11,153,287 B2
(45) Date of Patent: Oct. 19, 2021

(54) METHOD, APPARATUS, AND SYSTEM FOR MONITORING ENCRYPTED COMMUNICATION SESSION

(71) Applicant: Samsung Electronics Co., Ltd., Gyeonggi-do (KR)

(72) Inventors: Han-gil Moon, Seoul (KR); Jin-soo Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 39 days.

(21) Appl. No.: 15/742,816

(22) PCT Filed: Jun. 2, 2016

(86) PCT No.: PCT/KR2016/005836
§ 371 (c)(1),
(2) Date: Jan. 8, 2018

(87) PCT Pub. No.: WO2017/007132
PCT Pub. Date: Jan. 12, 2017

(65) Prior Publication Data
US 2018/0198766 A1    Jul. 12, 2018

(30) Foreign Application Priority Data

Jul. 6, 2015 (KR) .......................... 10-2015-0095856

(51) Int. Cl.
*H04L 29/06* (2006.01)
*H04L 9/08* (2006.01)
(Continued)

(52) U.S. Cl.
CPC ............ *H04L 63/0442* (2013.01); *H04L 9/08* (2013.01); *H04L 9/0825* (2013.01); *H04L 9/14* (2013.01);
(Continued)

(58) Field of Classification Search
CPC .. H04L 63/0442; H04L 9/08; H04W 12/0401; H04W 12/04071; H04W 4/80
See application file for complete search history.

(56) References Cited

U.S. PATENT DOCUMENTS 6,918,038 B1 *  7/2005  Smith ...................... G06F 8/65
                                                709/223
7,965,846 B2    6/2011  Masuhiro et al.
(Continued)

FOREIGN PATENT DOCUMENTS

CN      101262331      9/2008
JP      2007-267064    10/2007
(Continued)

OTHER PUBLICATIONS

International Search Report dated Sep. 1, 2016 issued in counterpart application No. PCT/KR2016/005836, 25 pages.
(Continued)

*Primary Examiner* — Jeffrey C Pwu
*Assistant Examiner* — Rodman Alexander Mahmoudi
(74) *Attorney, Agent, or Firm* — The Farrell Law Firm, P.C.

(57) ABSTRACT

The disclosure relates to a method of supporting monitoring of an encrypted data communication session of a first device, the method comprising: receiving a signal for initiating a communication session with a second device; generating an encryption key for encryption of the communication session; determining whether a monitoring signal is received for the communication session; and transmitting information about the encryption key to the second device by using a predetermined packet based on the determination.

10 Claims, 17 Drawing Sheets

(51) Int. Cl.
*H04L 9/14* (2006.01)
*H04W 12/041* (2021.01)
*H04W 12/80* (2021.01)
*H04W 12/0471* (2021.01)
*H04W 4/80* (2018.01)

(52) U.S. Cl.
CPC ...... *H04L 29/06319* (2013.01); *H04L 63/061* (2013.01); *H04L 63/1408* (2013.01); *H04L 63/306* (2013.01); *H04W 12/041* (2021.01); *H04W 12/0471* (2021.01); *H04W 12/80* (2021.01); *H04W 4/80* (2018.02)

(56) References Cited

U.S. PATENT DOCUMENTS

| | | | |
|---|---|---|---|
| 8,644,510 B2 | 2/2014 | Cakulev et al. | |
| 8,867,745 B2 | 10/2014 | Rose et al. | |
| 2003/0037235 A1* | 2/2003 | Aziz | H04L 63/20 713/160 |
| 2004/0030894 A1* | 2/2004 | Labrou | G06Q 20/02 713/168 |
| 2005/0063544 A1 | 3/2005 | Uusitaio et al. | |
| 2008/0219445 A1 | 9/2008 | Yato et al. | |
| 2008/0307217 A1* | 12/2008 | Yukimatsu | H04L 12/40104 713/150 |
| 2009/0220080 A1 | 9/2009 | Heme et al. | |
| 2010/0002880 A1 | 1/2010 | Yoon et al. | |
| 2011/0145584 A1* | 6/2011 | Coburn | G06F 21/602 713/176 |
| 2016/0173364 A1* | 6/2016 | Pitio | G06F 21/6227 709/226 |
| 2016/0294786 A1* | 10/2016 | Marquez Mendoza | H04L 63/0428 |
| 2018/0070237 A1* | 3/2018 | Cho | H04W 12/08 |

FOREIGN PATENT DOCUMENTS

| | | |
|---|---|---|
| JP | 2008-035235 | 2/2008 |
| KR | 10-0838556 | 6/2008 |
| KR | 100852146 | 8/2008 |
| KR | 1020140030352 | 3/2014 |
| KR | 10-1516909 | 5/2015 |
| WO | WO 2015/088296 | 6/2015 |

OTHER PUBLICATIONS

Chinese Office Action dated Jun. 2, 2020 issued in counterpart application No. 201680040278.9, 15 pages.

* cited by examiner

METHOD, APPARATUS, AND SYSTEM FOR MONITORING ENCRYPTED COMMUNICATION SESSION

PRIORITY

This application is a National Phase Entry of PCT International Application No. PCT/KR2016/005836, which was filed on Jun. 2, 2016, and claims priority to Korean Patent Application No. 10-2015-0095856, which was filed on Jul. 6, 2015, the contents of each of which are incorporated herein by reference.

TECHNICAL FIELD

The present disclosure relates to methods, apparatuses, and systems for monitoring supporting for an encrypted communication session.

BACKGROUND ART

With the development of Internet of Things (IoT) technology, devices have been connected through a network and share information. However, as transmission and reception of data through the network become more active, increased security of the data transmitted and received by devices is required. However, legitimate monitoring may be necessary for activities to maintain social order, such as investigations by investigative agencies such as police, the National Security Agency, and anti-terrorism agencies. The legitimate monitoring and maintenance of security conflict with each other, and thus there is a need for a monitoring support method capable of satisfying both of these requirements.

FIGS. 1A and 1B show a monitoring support method according to the prior art.

Referring to FIG. 1A, a server 30 initiates a session between a first device 10 and a second device 20 and provides an encryption key to be used in the session between the first device 10 and the second device 20 to the first device 10 and the second device 20. The first device 10 and the second device 20 perform encrypted communication using the encryption key received from the server 30. When legitimate monitoring is required, the server 30 provides the encryption key used in the session to an investigation agency requiring performance of the monitoring, and the investigation agency monitors a communication session between the first device 10 and the second device 20 using the encryption key provided from the server 30.

Referring to FIG. 1B, the server 30 initiates the session, but unlike in FIG. 1A, the server 30 does not provide the encryption key to be used in the session between the first device 10 and the second device 20 to the first device 10 and the second device 20. If monitoring of the investigation agency is required, the server 30 prepares a separate path for obtaining a session key from the first device 10 (for example, a backdoor method), and, when the encryption key is required, provides the obtained session key to the investigation agency using the prepared path.

However, the conventional method has a problem in that since the server 30 stores the encryption key, there is a risk that the encrypted communication session is monitored in addition to the legitimate monitoring by the investigation agency, and the encryption key stored in the server 30 may be stolen. Also, in the case where the server 30 does not store the key, there is a problem in that other information stored in the first device 10 may also be leaked via the path prepared for obtaining the session key from the first device 10.

DETAILED DESCRIPTION OF THE INVENTION

Technical Problem

The present disclosure provides a method capable of monitoring a communication session while maintaining security.

Technical Solution

According to some embodiments, a method of supporting monitoring of an encrypted data communication session of a first device comprises: receiving a signal for initiating a communication session with a second device; generating an encryption key for encryption of the communication session; determining whether a monitoring signal is received for the communication session; and transmitting information about the encryption key to the second device by using a predetermined packet based on the determination.

A third device may obtain the information about the encryption key by obtaining the predetermined packet.

The method may include the third device that decrypts encrypted data transmitted and received through the session by obtaining information about the encryption key.

The generating of the encryption key may comprise: generating the encryption key based on at least one of an encryption algorithm of the first device and the second device, a public key of the communication session, and a private key of the first device.

The generating of the encryption key may comprise: generating the encryption key to be different from an encryption key generated by the second device.

The generating of the encryption key may comprise: generating the encryption key for each of at least one piece of content transmitted and received via the communication session, wherein the determining whether the monitoring signal is received comprises: determining which content among the at least one piece of content relates to the received monitoring signal, and wherein the transmitting of the information about the encryption key to the second device by using the predetermined packet based on the determination comprises: transmitting information about an encryption key of the content to be monitored to the second device by using the predetermined packet based on determination.

The information about the encryption key may be at least a part of the encryption key.

The generating of the encryption key for encryption of the communication session may comprise: receiving, from the second device, encryption protocol version information used for encryption of the communication session, an identifier for identifying a session with the second device, and information about an encryption algorithm supported by the second device; determining an encryption algorithm for generating the encryption key based on the received information; and generating the encryption key by using the determined encryption algorithm.

The encryption key may be different from the encryption key generated by the second device.

According to some embodiments, a method of supporting monitoring of an encrypted communication session comprises: a first device receiving a signal for initiating a communication session with a second device; a third device transmitting a monitoring signal for a communication session to the first device; the first device generating an encryption key for encryption of the communication session; the first device transmitting information about the encryption key to the second device through a predetermined packet based on whether the monitoring signal is received; the third device obtaining the predetermined packet to be transmitted to the second device based on at least one of address information of the first device and address information of the second device; and the third device generating an encryption key for the communication session based on information about the encryption key included in the predetermined packet.

The third device may decrypt encrypted data transmitted and received through the communication session based on the generated encryption key.

The information about the encryption key may be at least a part of the encryption key.

The generating may include: the third device obtaining a key generation function; and generating an encryption key for the communication session based on the obtained key generation function and information about the encryption key included in the predetermined packet.

The predetermined packet may be a packet including a ZRTP Confirm message.

The generating of the encryption key may comprise: generating an encryption key for each of at least one piece of content transmitted and received via the communication session, wherein the transmitting of the monitoring signal comprises: determining which content to monitor among the at least one piece of content; and transmitting a monitoring signal based on the determination, and wherein the transmitting of the information about the encryption key to the second device by using the predetermined packet comprises: transmitting information about an encryption key of the content to be monitored to the second device by using the predetermined packet based on the received monitoring signal.

The encryption key generated by the third device may be the same as the encryption key generated by the first device and is different from the encryption key generated by the second device, and wherein the third device decrypts only data transmitted from the first device to the second device based on the generated encryption key.

According to some embodiments, a method, performed by a third device, of monitoring an encrypted data communication session between a first device and a second device includes obtaining address information of the first device or the second device; transmitting a monitoring signal for a communication session between the first device and the second device; obtaining, based on the obtained address information, a predetermined packet including information about an encryption key of the communication session transmitted through the communication session to be monitored; generating the encryption key of the communication session based on the information about the encryption key; and decrypting encrypted data transmitted and received through the communication session based on the generated encryption key.

According to some embodiments, provided is a non-transitory computer-readable recording medium having recorded thereon a program for executing the method.

The device may obtain information about the encryption key by obtaining the predetermined packet transmitted by the transmitter.

The third device that obtained the predetermined packet transmitted by the transmitter may decrypt encrypted data transmitted and received through the communication session by obtaining the encryption key.

The controller may generate an encryption key based on at least one of an encryption algorithm of the first device and the second device, a public key of the communication session, and a private key of the first device.

The controller may generate an encryption key different from the encryption key generated by the second device.

The controller may be further configured to generate the encryption key for each of at least one piece of content transmitted and received via the communication session, and determine which content among the at least one piece of content relates to the received monitoring signal, and wherein the transmitter is further configured to transmit information about an encryption key of the content to be monitored to the second device by using the predetermined packet based on the determination.

The information about the encryption key may be at least a part of the encryption key.

The transmitter may transmit information about the encryption key to the second device using a packet including a ZRTP confirm message.

The receiver may be further configured to receive, from the second device, encryption protocol version information used for encryption of the communication session, an identifier for identifying a session with the second device, and information about an encryption algorithm supported by the second device, and wherein the controller is further configured to determine an encryption algorithm for generating the encryption key based on the received information and generate the encryption key by using the determined encryption algorithm.

The encryption key may be different from the encryption key generated by the second device.

According to some embodiments, a monitoring support system for an encrypted communication session includes: a first device configured to receive a communication session initiation signal with a second device, generate an encryption key for the encryption key, and transmit information about the encryption key to the second device through a predetermined packet based on whether a monitoring signal is received; and a third device configured to transmit the monitoring signal for the communication session to the first device, obtain the predetermined packet transmitted to the second device based on at least one of address information of the first device and address information of the second device, generate an encryption key for the communication session based on information about the encryption key included in the predetermined packet, and decrypt encrypted data transmitted and received through the communication session based on the generated encryption key.

The information about the encryption key may be at least a part of the encryption key.

The third device may obtain a key generation function, and generate the encryption key for the communication session based on the obtained key generation function and the information about the encryption key included in the predetermined packet.

The predetermined packet may include a ZRTP Confirm message.

The third device may generate an encryption key for each of at least one piece of content transmitted and received through the communication session, determine which content to monitor among the at least one piece of content, and transmit a monitoring signal to the second device based on determination, and the first device may transmit information about the encryption key for the content to be monitored to the second device using the predetermined packet based on the received monitoring signal.

The encryption key generated by the third device is the same as the encryption key generated by the first device and is different from the encryption key generated by the second device, and the third device may generate only data transmitted from the first device to the second device based on the generated encryption key.

According to some embodiments, a third device for monitoring an encrypted data communication channel between a first device and a second device comprises: an address information obtainer configured to obtain address information of the first device or the second device; a transmitter configured to transmit a monitoring signal for a communication session between the first device and the second device; a receiver configured to obtain a predetermined packet including information about an encryption key of the communication session transmitted through the communication session to be monitored based on the obtained address information; and a controller configured to generate an encryption key of the communication session based on the information about the encryption key and decrypt encrypted data transmitted and received through the communication session based on the generated encryption key.

Advantageous Effects of the Invention

The embodiments of the present disclosure provide a monitoring method capable of monitoring an encrypted communication session while maintaining the security of the encrypted communication session and a monitoring support method.

BRIEF DESCRIPTION OF THE DRAWINGS

FIG. 9 shows a ZRTP confirm message including encryption key information.

BEST MODE

Figure 1A:
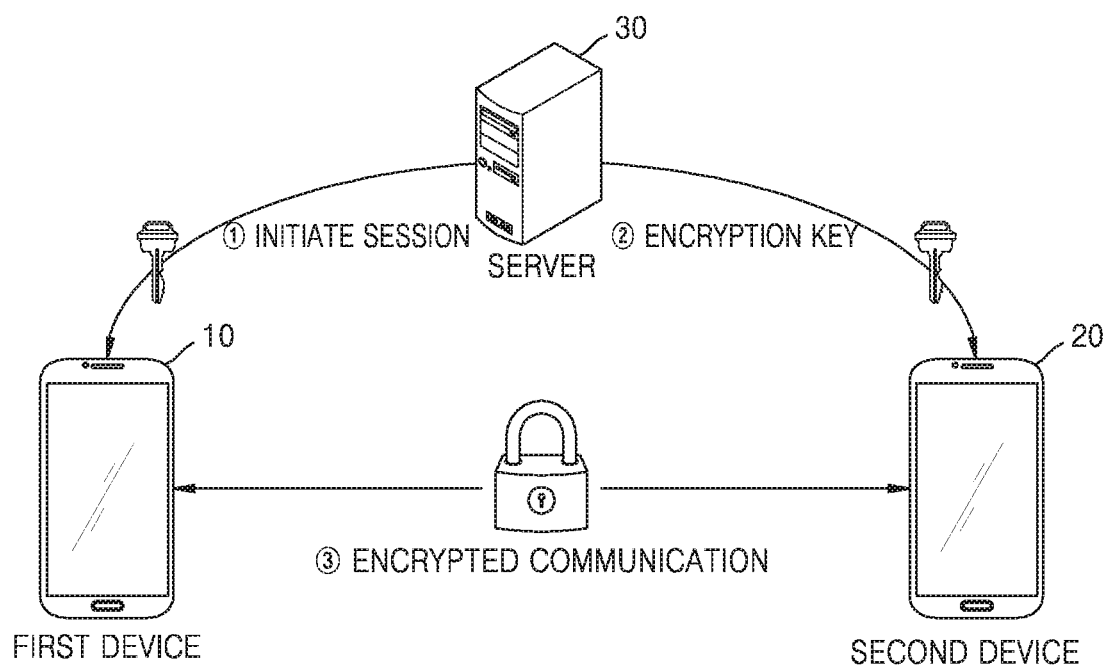
FIGS. 1A and 1B show a monitoring support method according to the prior art.
Figure 1B:
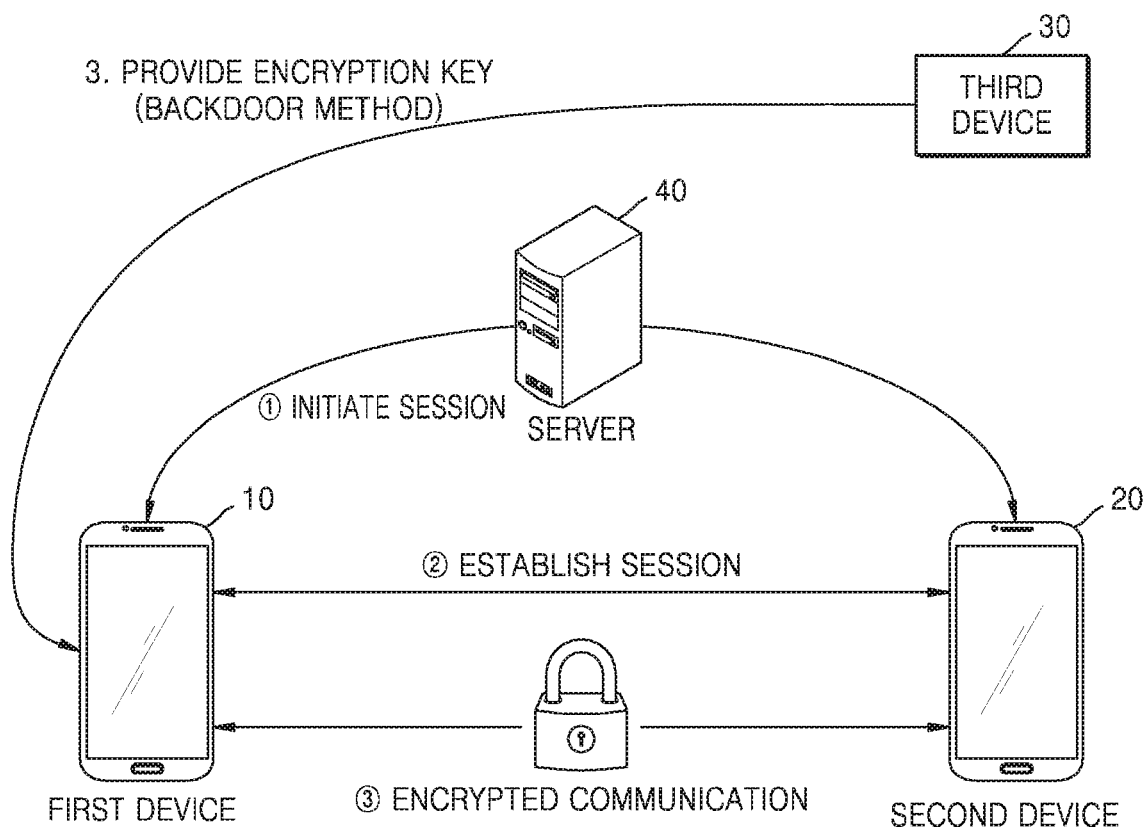

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Throughout the specification, it will be understood that when an element is referred to as being "connected with" another element, it may be directly connected with the other element, or electrically connected with the other element while intervening elements may also be present. It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

Throughout the specification, a "device" may include a personal computer (PC), a cellular phone, a smart phone, a TV, a tablet PC, a personal digital assistant (PDA), a portable multimedia player (PMP), a navigation, an MP3 player, a digital camera, a refrigerator, a washing machine, a cleaner, etc. but is not limited thereto and may include various devices.

Throughout the specification, a server 104 may include a single server, a set of servers, and a cloud server and may include a service server providing service such as a VOIP service, a content providing service, etc., but is not limited thereto.

Throughout the specification, a communication session is a connection established (or formed) using all communication methods, and may mean a connection or connection period used for transmitting and receiving data between devices, such as a channel for communication.

According to some embodiments, a communication method may include all communication methods such as a predetermined communication standard, a predetermined frequency band, a predetermined protocol, or a communication through a predetermined channel. For example, the communication method may include communication methods through Bluetooth, BLE, Wi-Fi, Zigbee, 3G, LTE, ultrasound, etc., and may include all short distance communication, long distance communication, wireless communication and wired communication. However, the communication method is not limited to the above examples.

Throughout the specification, the short distance communication method may mean a communication method in which two devices may communicate with each other only within a predetermined range, and may include Bluetooth, NFC, and the like, for example.

Throughout the specification, the long distance communication method may mean a communication method in which two devices may communicate with each other regardless of a distance. For example, the long distance communication method may mean a method in which two devices may communicate with each other through a repeater, such as an AP, more than a predetermined distance, and may include a communication method using a cellular network such as an SMS or a telephone. However, the long distance communication method is not limited to the examples described above, and may include all communication methods except for the short distance communication method.

Throughout the specification, encryption refers to a process of converting data to be communicated according to a predetermined method, and may include secret or security. Decryption refers to an opposite process of encryption. Encrypted data may be decrypted only by a receiving device negotiated with a device transmitting data.

Throughout the specification, an encryption key may include data transmitted and received between devices or data used to encrypt a session. The encryption key may include both a public key (an asymmetric key) and a secret key (a symmetric key). The encryption key may be generated via a key generation algorithm (or a key generation function) stored in a device. The key generation algorithm may include various algorithms such as AES, MD5, and ECDH, and is not limited to the above examples.

Throughout the specification, a private key may include key data held by only one of a plurality of devices. The private key may be used in a public key encryption system to decrypt data encrypted with a public key, and is not limited to the above example.

Throughout the specification, a service may include any type of service. For example, the service may include services such as provision of content, voice over Intensity protocol (VOIP), and is not limited to the above examples.

Throughout the specification, monitoring means an operation in which a third device monitors data transmitted and received between a first device and a second device. The monitoring may include, for example, an operation in which the third device confirms data transmitted and received between the first device and the second device through an operation of intercepting the data between the first device and the second device, but is not limited to the above example. The monitoring in the present disclosure may mean monitoring of the third device with legitimate monitoring authority. The monitoring may include tapping/eavesdropping/intercepting.

Throughout the specification, ZRTP (Composed of Z and Realtime Transport Protocol) may mean a Diffie-Hellman key exchange scheme developed by Phil Zimmermann and an encryption key exchange protocol using SRTP (Secured Real-time Transport Protocol) used to maintain security of data. ZRTP is used in a Voice Over Internet Protocol (VOIP) service, but is not limited to the above examples and may be used in all services requiring encrypted communication.

Figure 2:
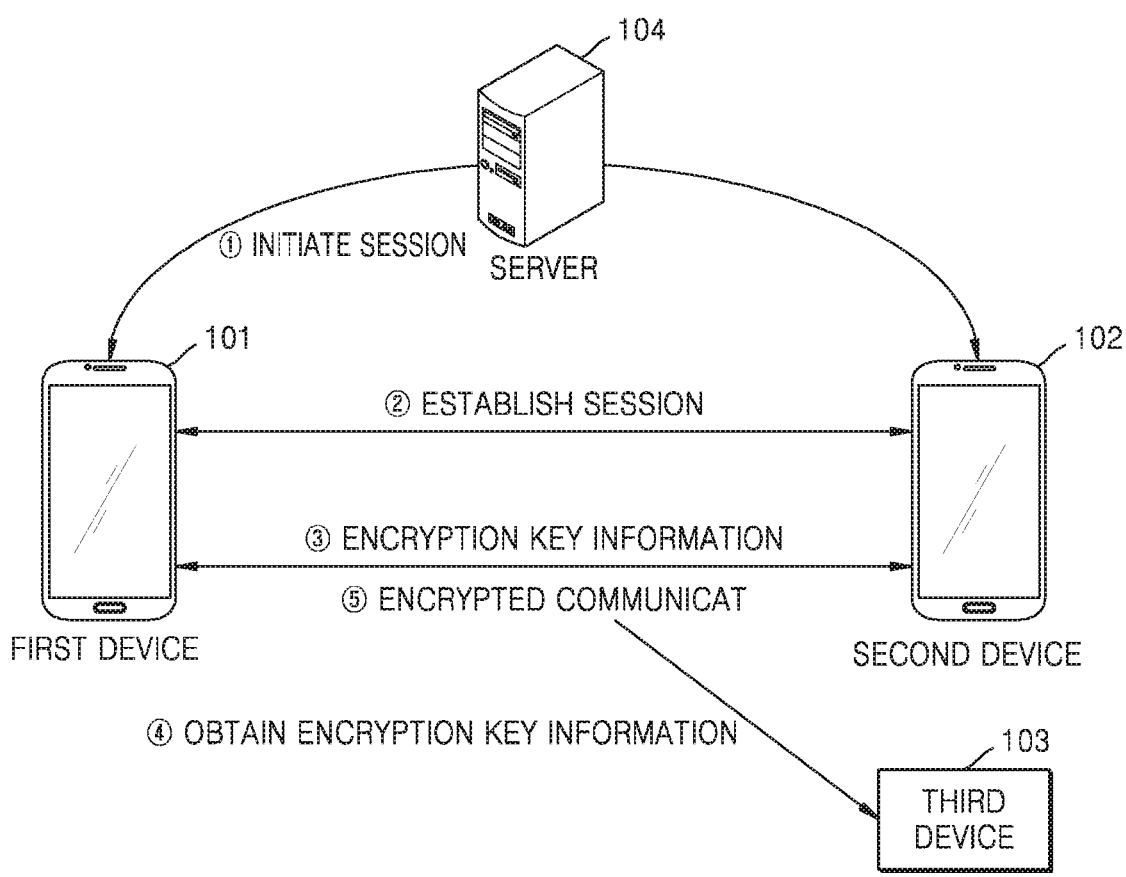
FIG. 2 illustrates a monitoring support system of an encrypted communication session according to some embodiments.

FIG. 2 illustrates a monitoring support system of an encrypted communication session according to some embodiments.

According to some embodiments, a first device 101 may receive a session initiation signal requesting to initiate a session with a second device 102 from a server 104. Initiation of the session may be performed under the control of the server 104. For example, when the second device 102 transmits a request for forming the session with the first device 101 to the server 104, the server 104 transmits the session initiation signal to the first device 101 and the second device 102 by the request for forming the session of the second device 102.

In some embodiments, the first device 101 may perform session establishment with the second device 102. According to some embodiments, establishment of the session includes an operation of transmitting and receiving a version of a protocol to be used in the session formed between the first device 101 and the second device 102, device identification information, negotiating an algorithm for generating an encryption key, and transmitting and receiving information of the encryption key algorithm and a hash value.

For example, the first device 101 may transmit and receive ZRTP protocol version information, a hash value generated based on a message received from the second device 102 and a hash function, and information for determining an encryption algorithm determined by a negotiation between the first device 101 and the second device 102.

According to some embodiments, the third device 103 may transmit a monitoring signal to the first device 101. The monitoring signal may include a signal that the third device 103 will obtain at least a part of data transmitted or received between the first device 101 and the second device 102 to the first device 101. Since monitoring is possible without the consent of a party in some cases with legitimate rights, monitoring is not related to a user of the first device 101 or the consent of the first device 101, and the third device 103 of the present disclosure means a device that has a legitimate and proper monitoring authority.

According to some embodiments, the third device 103 may determine which content to be monitored among at least one piece of content to be transmitted over the communication session and may transmit a monitoring signal based on the determination.

According to some embodiments, the first device 101 and the second device 102 may generate an encryption key based on the encryption algorithm determined by the session establishment. According to some embodiments, the first device 101 may transmit encryption key information to the second device 102. The second device 102 may also transmit the encryption key information to the first device 101.

According to some embodiments, the first device 101 may be generated based on at least one of the encryption algorithm of the second device 102, the public key of the communication session established with the second device 102, and the private key of the first device 101. Also, the encryption key generated by the first device 101 and the encryption key generated by the second device 102 may be different.

Also, according to some embodiments, the first device 101 may generate the encryption key for each of at least one piece of content transmitted and received via the communication session established with the second device 102. When the first device 101 transmits the encryption key information to the second device 102 based on the monitoring information, the first device 101 may determine which content among the at least one piece of content relates to the received monitoring signal, and may transmit at least one of the encryption keys for the at least one piece of content based on a result of determination. That is, the first device 101 may transmit the encryption key for the content to be monitored.

According to some embodiments, the encryption key information may be at least a part of the encryption key. In other words, the encryption key information may be information about a part of the encryption key and may include information that may be reconstructed and generated as an encryption key by a predetermined key generation algorithm, and is not limited to the above example.

According to some embodiments, the first device 101 may transmit the encryption key information to the second device 102 based on the monitoring signal received from the third device 103. The second device 102 may also transmit the encryption key information to the first device 101 based on the monitoring signal received from the third device 103.

According to some embodiments, the first device 101 may transmit information about the encryption key to the second device 102 using a predetermined packet. According to some embodiments, the predetermined packet may be a packet including a confirm message of ZRTP.

According to some embodiments, the third device 103 may obtain the encryption key information. According to some embodiments, the third device 103 may perform monitoring to obtain the encryption key information transmitted by the first device 101 to the second device 102. For example, the third device 103 may obtain the encryption key information by intercepting packets transmitted and received between the first device 101 and the second device 102.

According to some embodiments, the third device 103 may obtain the information about the encryption key by obtaining a predetermined packet. For example, the third device 103 may obtain the information about the encryption key by obtaining a packet including the confirm message of ZRTP.

According to some embodiments, the third device 103 may obtain identification information of the first device 101 or the second device 102, and based on the obtained identification information, intercept the packets transmitted and received between the first device 101 and the second device 102. The third device 103 may obtain the identification information of at least one of the first device 101 or the second device 102 by a server or a separate user input.

According to some embodiments, address information may include all address information of a terminal such as a MAC address, an IP address, and a telephone number, or terminal information such as a serial number, and is not limited to the above example.

According to some embodiments, the third device 103 may obtain the key generation algorithm (or a key generation function) by the server, a manufacturer of the first device 101 or the second device 102, or a separate user input. The third device 103 may generate or reconstruct the encryption key using the obtained key generation algorithm or key generation function and the obtained encryption key information. The encryption key generated by the third device 103 based on the encryption key information may be the same as the encryption key generated by at least one of the first device 101 and the second device 102.

According to some embodiments, the first device 101 may perform encryption communication with the second device 102. That is, the first device 101 and the second device 102 may encrypt data to be transmitted and received based on the encryption key generated above, and transmit the encrypted data to a counterpart device. The third device 103 may obtain the encrypted data transmitted and received between the first device 101 and the second device 102 and decrypt the encrypted data based on the encryption key previously generated by the third device 103.

Figure 3:
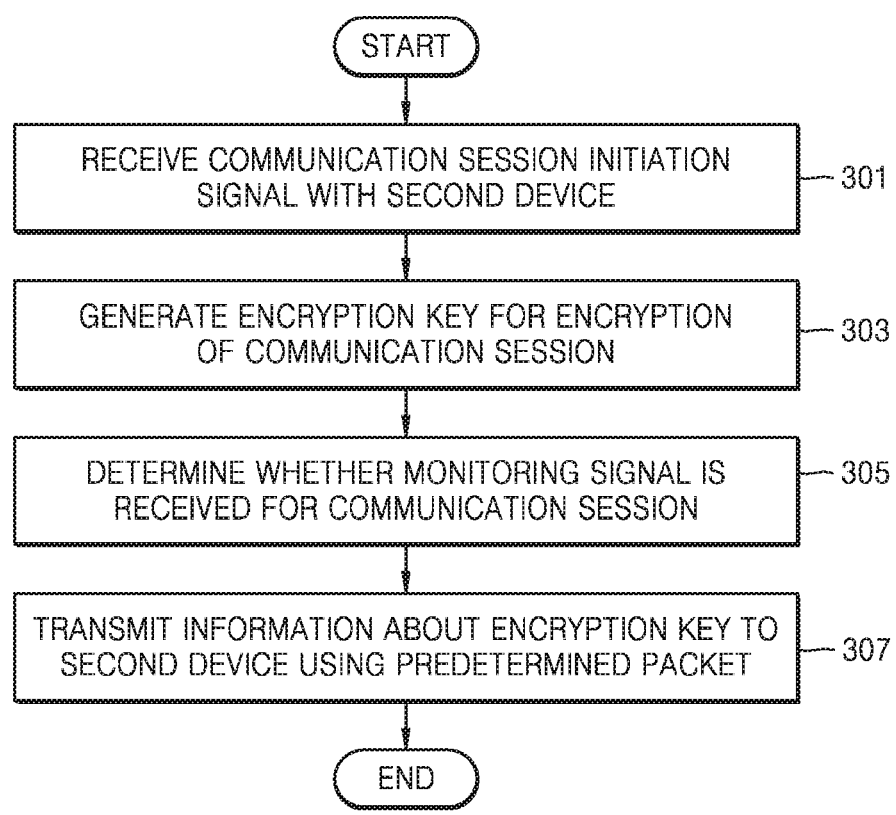
FIG. 3 illustrates a flowchart for explaining a method of supporting monitoring of a communication session between a first device and a second device according to some embodiments.

FIG. 3 illustrates a flowchart for explaining a method of supporting monitoring of a communication session between a first device and a second device according to some embodiments.

In step 301, the first device may receive a communication session initiation signal with the second device.

According to some embodiments, the first device may receive the communication session initiation signal with the second device from a server. The communication session initiation signal may include a signal requesting to initiate a communication session with the second device or a plurality of devices including the second device, and is not limited to the above example. The first device may also receive the communication session initiation signal from the second device.

In step 303, the first device may generate an encryption key for encryption of the communication session.

According to some embodiments, the first device may generate the encryption key based on at least one of an encryption algorithm of the first device and the second device, a public key of the communication session with the second device, and a private key of the first device. Also, according to some embodiments, the first device may negotiate the encryption algorithm with the second device, and may generate an encryption key based on the encryption algorithm determined according to a result of negotiation.

According to some embodiments, the step of the first device negotiating the encryption algorithm with the second device may include receiving encrypting protocol version information used for encrypting the communication session from the second device, an identifier for identifying the session with the second device, information about an encryption algorithm supported by the second device, determining an encryption algorithm based on the received information, and generating the encryption key based on the determined encryption algorithm.

According to some embodiments, the first device may generate a different encryption key from the second device. For example, the first device and the second device may generate and use the same encryption key upon encryption communication, and the first device and the second device may generate and use different encryption keys.

Also, according to some embodiments, the first device may generate an encryption key for each of at least one piece of content transmitted and received via the communication session. For example, if the first device provides at least one piece of content to the second device, the first device may encrypt and transmit each piece of the content with a different encryption key. The content may also be classified according to resolution. That is, even the same music file may be classified into different contents according to sound quality. Accordingly, the first device may transmit the content to the second device by encrypting the content with different encryption keys according to resolution and sound quality.

In step 305, the first device may determine whether to receive a monitoring signal for the communication session.

According to some embodiments, the first device may receive the monitoring signal for the communication session from a third device. The first device may receive the monitoring signal for the communication session from the server.

According to some embodiments, the first device may determine that the monitoring signal has been received by receiving a predetermined code and a predetermined packet. In addition, the monitoring signal received by the first device may include information (e.g., a session identifier) about which communication session to be monitored, and may include information about which content to be monitored.

Accordingly, when the first device receives the monitoring signal, the first device may determine which content among at least one piece of content to be transmitted relates to the received monitoring signal.

According to some embodiments, if the first device and the second device generate different encryption keys, the third device may transmit the monitoring signal to at least one of the first device or the second device. That is, the third device may select a device that wants to perform monitoring and transmit the monitoring signal. This will be described in detail in FIG. 11.

In step 307, the first device may transmit information about the encryption key to the second device using a predetermined packet.

According to some embodiments, the information about the encryption key may include all of the encryption key or a part of the encryption key. That is, the information about the encryption key may be at least a part of the encryption key.

Also, according to some embodiments, the first device may transmit the information about the encryption key to the second device using a packet including a confirm message of ZRTP. For example, the first device may perform encryption using ZRTP for encryption of the communication session of the second device. In the case of using ZRTP, the first device may transmit a confirm message, which is a message for confirming the encryption algorithm determined by negotiation with the second device and the generated encryption key. When transmitting the confirm message, the first device may insert the information about the encryption key generated in step 305 into the confirm message.

According to some embodiments, the first device may determine which content among at least one piece of content to be transmitted by the first device relates to a received monitoring signal, and based on a result of determination, transmit information about an encryption key for the content to be monitored to the second device using a predetermined packet.

Figure 4:
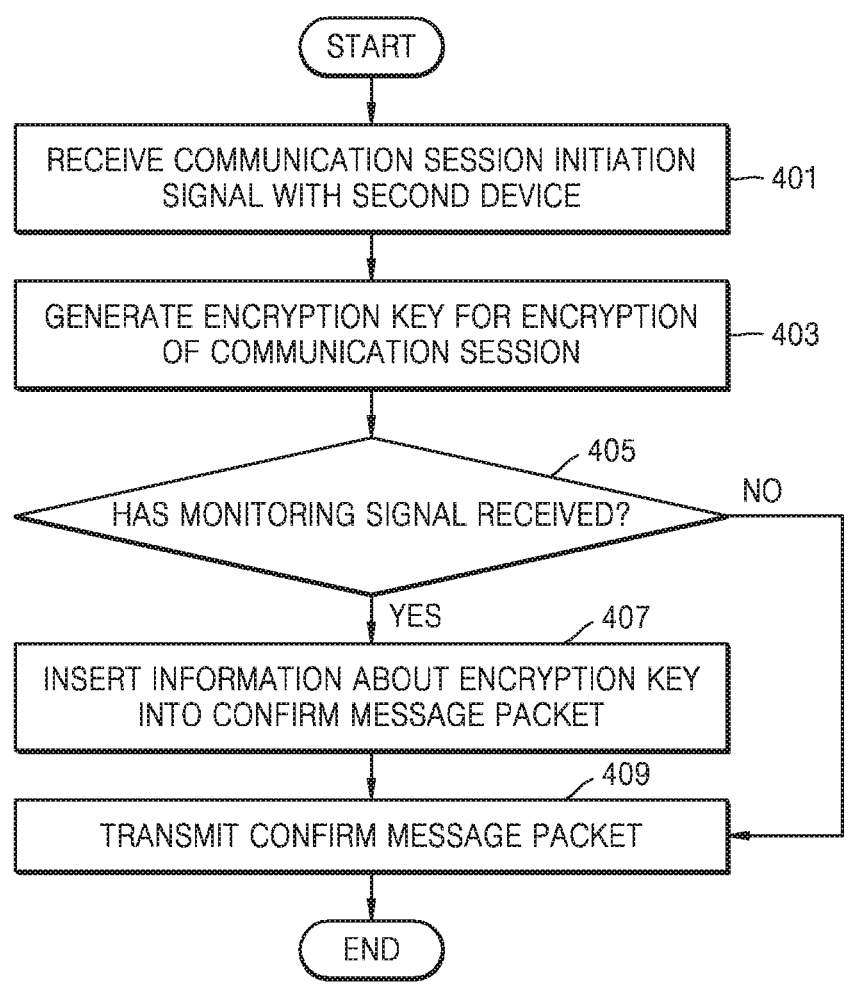
FIG. 4 illustrates a detailed flowchart for explaining a method of supporting monitoring of a communication session between a first device and a second device according to some embodiments.

FIG. 4 illustrates a detailed flowchart for explaining a method of supporting monitoring of a communication session between a first device and a second device according to some embodiments.

In step 401, the first device may receive a communication session initiation signal with the second device.

In step 403, the first device may generate an encryption key for encryption of the communication session. Since steps 401 to 403 correspond to those described in FIG. 3, detailed descriptions thereof are omitted.

In step 405, the first device may determine whether a monitoring signal has been received. If the first device has received the monitoring signal, a process proceeds to step 407, and if the first device has not received the monitoring signal, the process proceeds to step 409.

In step 407, the first device may insert information about the encryption key into a confirm message packet.

According to some embodiments, the first device may insert the information about the encryption key into the confirm message based on whether or not the first device has received monitoring information. If the monitoring information has not been received, the first device may not insert the information about the encryption key into the confirm message.

When monitoring is not required, since a third device does not obtain a confirm message packet, and the first device and the second device have generated the encryption key by negotiation, the first device may not need to transmit the information about the encryption key to the second device.

In step 409, the first device may transmit the confirm message packet.

According to some embodiments, the first device may transmit the confirm message packet to the second device.

As described above, when the first device receives the monitoring signal, the first device may insert the encryption key information in the confirm message and transmit the confirm message packet into which the encryption key information is inserted. However, when the first device does not receive the monitoring signal, since the first device does not insert the encryption key information, the first device may transmit a confirm message packet into which the encryption key information is not inserted.

According to some embodiments, the third device may obtain the confirm message packet transmitted by the first device, generate an encryption key based on the encryption key information included in the obtained confirm message packet, and based on the generated encryption key, decrypt encrypted data transmitted and received between the first device and the second device.

Figure 5:
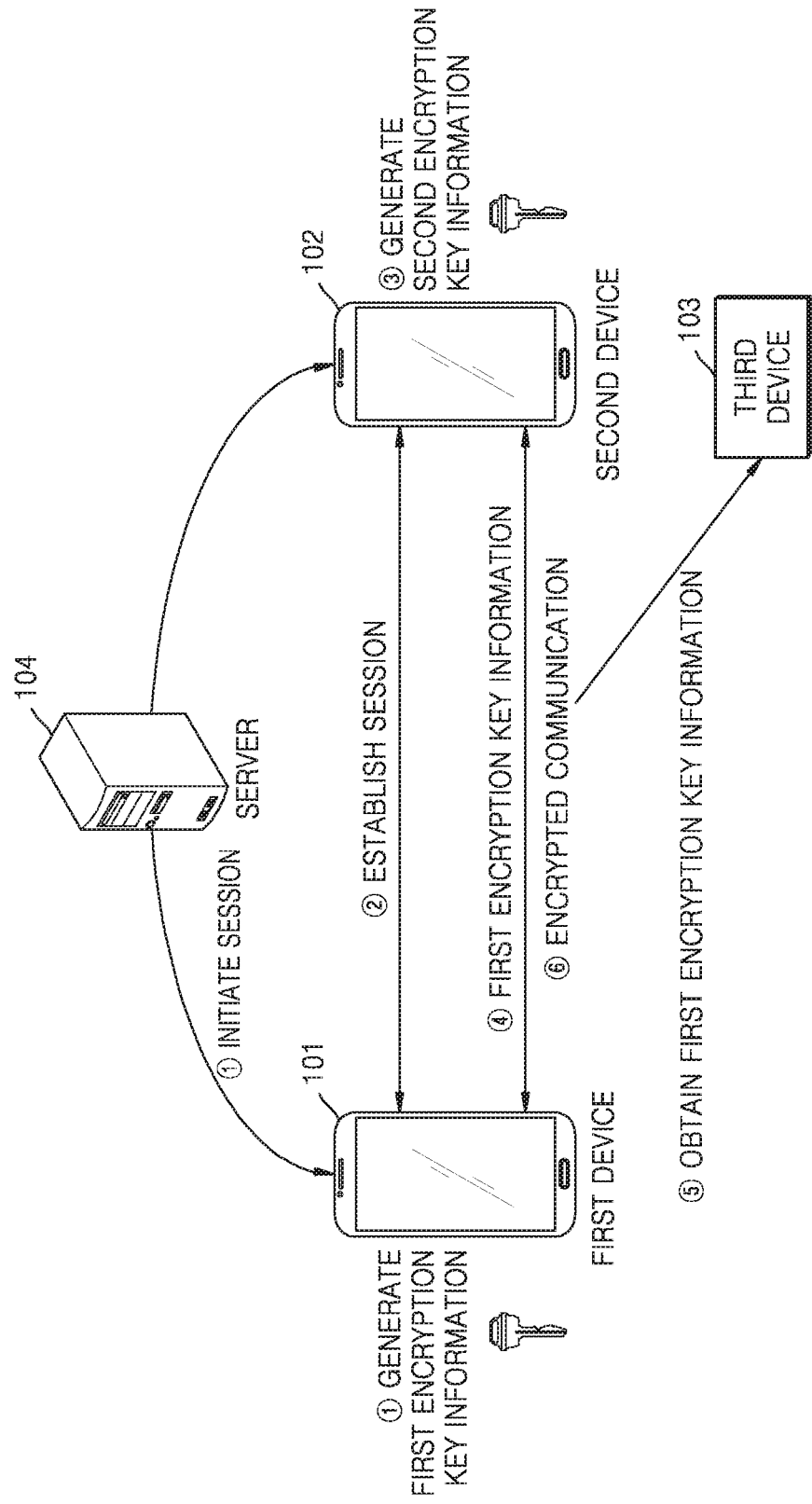
FIGS. 5 and 6 illustrate a system for explaining a monitoring method according to a method of generating an encryption key of a communication session between a first device and a second device according to some embodiments.
Figure 6:
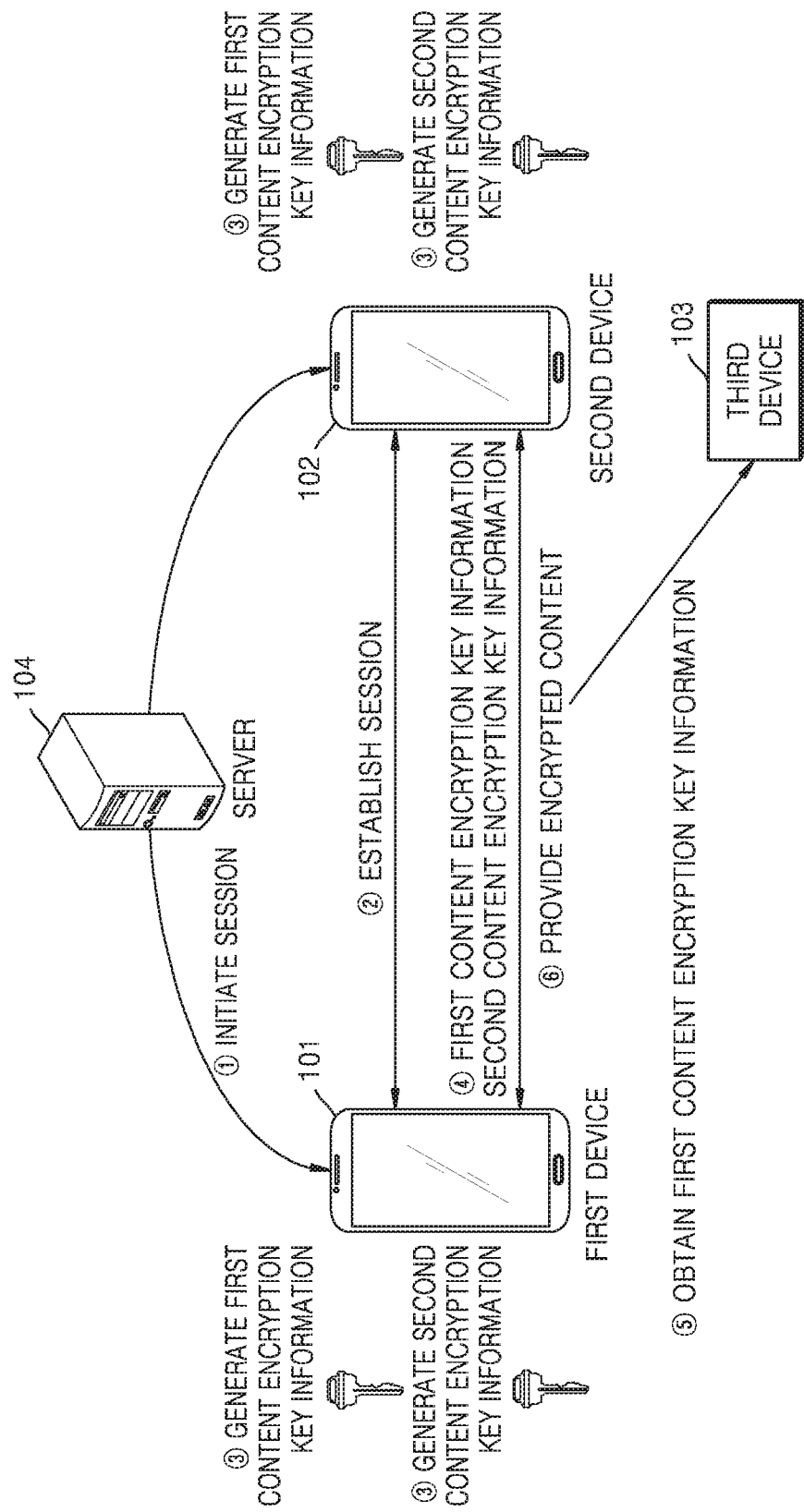

FIGS. 5 and 6 illustrate a system for explaining a monitoring method according to a method of generating an encryption key of a communication session between a first device and a second device according to some embodiments.

FIG. 5 illustrates a monitoring support system when the first device 101 and the second device 102 generate different encryption keys.

According to some embodiments, the first device 101 may receive a session initiation signal from the server 104. The first device 101 may then perform session establishment with the second device 102. This corresponds to that described in FIG. 2.

According to some embodiments, the first device 101 may generate a first encryption key based on session establishment with the second device 102. According to some embodiments, the first device 101 may generate a first encryption key that is different from a second encryption key generated by the second device 102. That is, the first device 101 and the second device 102 may encrypt and transmit data with different encryption keys. For example, the first device 101 and the second device 102 may use an asymmetric key encryption method.

According to some embodiments, the first device 101 may transmit information about the first encryption key to the second device 102. For example, when the first device 101 receives a monitoring signal, the first device 101 may transmit information about the first encryption key to the second device 102.

According to some embodiments, the first device 101 and the second device 102 may perform encrypted communication. For example, the first device 101 may encrypt and transmit data using the first encryption key, and the second device 102 may encrypt and transmit the data using the second encryption key. The data encrypted using the first encryption key may be decrypted with the second encryption key and the data encrypted using the second encryption key may be decrypted with the first encryption key.

According to some embodiments, the third device 103 may obtain information about the first encryption key. The third device 103 may obtain the information about the first encryption key, and may generate or reconstruct the first encryption key based on the obtained information about the first encryption key. Since the third device 103 has obtained only the first encryption key, the third device 103 may obtain only data that may be decrypted by the first device 101 with the first encryption key.

In other words, the third device 103 may decrypt only data transmitted by one of the first device 101 and the second device 102. That is, the third device 103 may monitor only one of the first device 101 and the second device 102.

FIG. 6 shows a monitoring support system when the first device 101 generates a different encryption key for each piece of content to be transmitted.

According to some embodiments, the first device 101 may receive a session initiation signal from the server 104. The first device 101 may then perform session establishment with the second device 102. This corresponds to that described in FIG. 2.

According to some embodiments, the first device 101 may generate a first content encryption key and a second content encryption key based on session establishment with the second device 102. According to some embodiments, the first device 101 may generate a different encryption key for each of at least one piece of content to be transmitted to the second device 102.

For example, the first device 101 may generate the first content encryption key, which is used to encrypt first content, and the second content encryption key, which is used to encrypt second content. The second device 102 may also generate the first content encryption key and the second content encryption key. However, as described in FIG. 5, the second device 102 may generate a third content encryption key and a fourth content encryption key that are different from the first content encryption key and the second content encryption key generated by the first device 101.

According to some embodiments, the first device 101 may transmit at least one of information about the first content encryption key and the second content encryption key to the second device 102. For example, the first device 101 may determine which content relates to a received monitoring signal, and based on a result of determination, may transmit at least one of the information about the first content encryption key and the information about the second content encryption key to the second device 102.

According to some embodiments, the first device 101 and the second device 102 may perform encrypted communication. For example, the first device 101 may encrypt and transmit the first content using the first content encryption key, and encrypt and transmit the second content using the second content encryption key. Each piece of content may be decrypted using a corresponding encryption key.

According to some embodiments, the third device 103 may obtain the information about the first content encryption key. The third device 103 may obtain the information about the first content encryption key and may generate or reconstruct the first content encryption key based on the obtained information about the first content encryption key. Since the third device 103 has obtained only the first content encryption key, the third device 103 may decrypt only the first content encrypted by the first device 101 with the first content encryption key.

In other words, the third device 103 may decrypt at least one of the at least one piece of content transmitted by the first device 101. That is, the third device 103 may select and monitor only one of a plurality of pieces of content transmitted by the first device 101.

Figure 7:
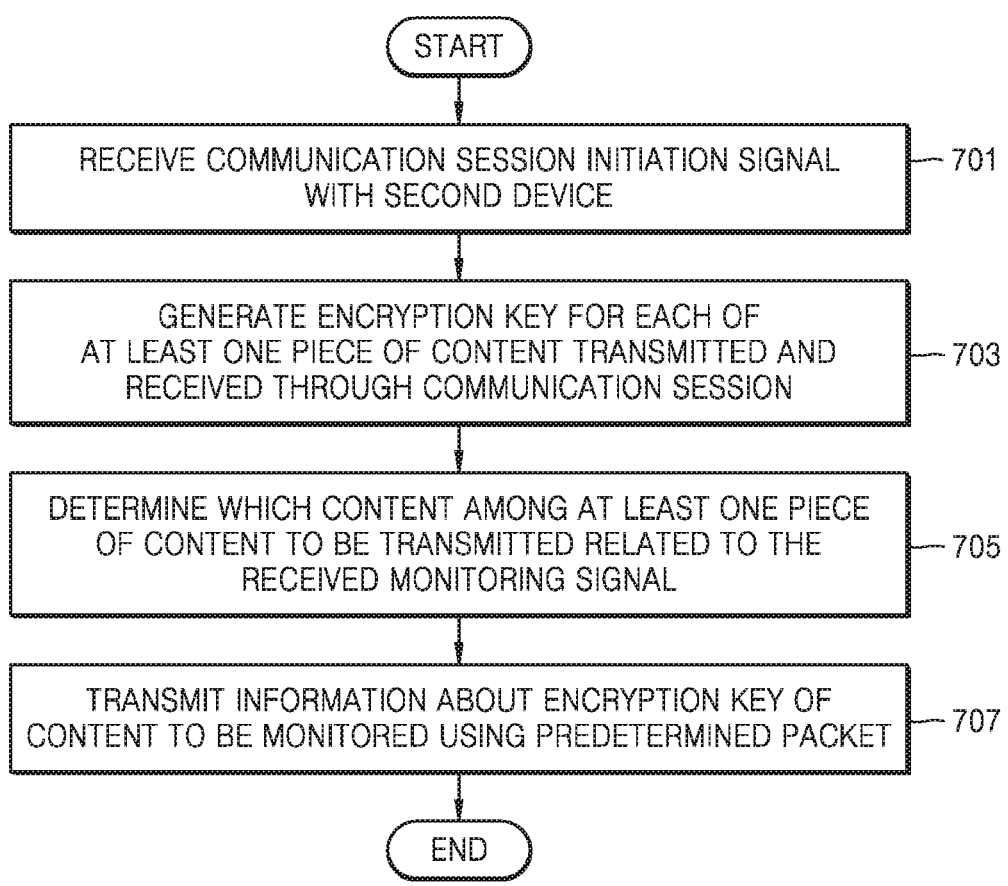
FIG. 7 shows a flowchart for explaining a monitoring method with respect to each piece of content according to some embodiments.

FIG. 7 shows a flowchart for explaining a monitoring method with respect to each piece of content according to some embodiments.

In step 701, a first device may receive a communication session initiation signal with a second device. Step 701 corresponds to that described in FIG. 3, and thus a detailed description thereof is omitted.

In step 703, the first device may generate an encryption key for each of at least one piece of content transmitted and received via a communication session.

According to some embodiments, the first device may transmit the at least one piece of content to the second device. The first device may encrypt the at least one piece of content using one encryption key or may encrypt each of the at least one piece of content using a different encryption key. In FIG. 7, a case where the first device encrypts each of the at least one piece of content using the different encryption key will be described.

According to some embodiments, the first device may generate the different encryption key to encrypt each of the at least one piece of content. The first device may also encrypt each of the at least one piece of content using the different encryption key, and may transmit each of the encrypted at least one piece of content to the second device.

For example, the first device may generate different encryption keys depending on a type of content such as music, image, moving image, text, encrypt and transmit the content using different encryption keys, and generate different encryption keys depending on quality of sound, resolution, etc., encrypt and transmit the content using different encryption keys but is not limited to the above example.

In step 705, the first device may determine which content among the at least one piece of content relates to a received monitoring signal.

According to some embodiments, a third device may determine which content to be monitored among content to be transmitted from the first device to the second device, and transmit the monitoring signal to the first device based on a result of determination.

In addition, the third device may receive a list of the content to be transmitted from the first device to the second device. The third device may also obtain information about the content to be transmitted from the first device to the second device from a server. Additionally, the third device may obtain at least one packet transmitted from the first device, and may determine content to be monitored based on information about the content included in the obtained packet but is not limited to the above example.

According to some embodiments, the first device may determine, based on the received monitoring signal, which content the third device desires to monitor. That is, the first device may determine, based on the received monitoring information, which content the third device desires to monitor. According to some embodiments, the monitoring signal may include information about which content the third device desires to monitor.

In step 707, the first device may transmit information about an encryption key for the content to be monitored using a predetermined packet.

According to some embodiments, the first device may insert and transmit the information about the encryption key of the content to be monitored into a confirm message. The third device may obtain a packet including the confirm message transmitted by the first device using a method such as intercept, and generate an encryption key capable of decrypting the content to be monitored based on the obtained packet information.

Figure 8:
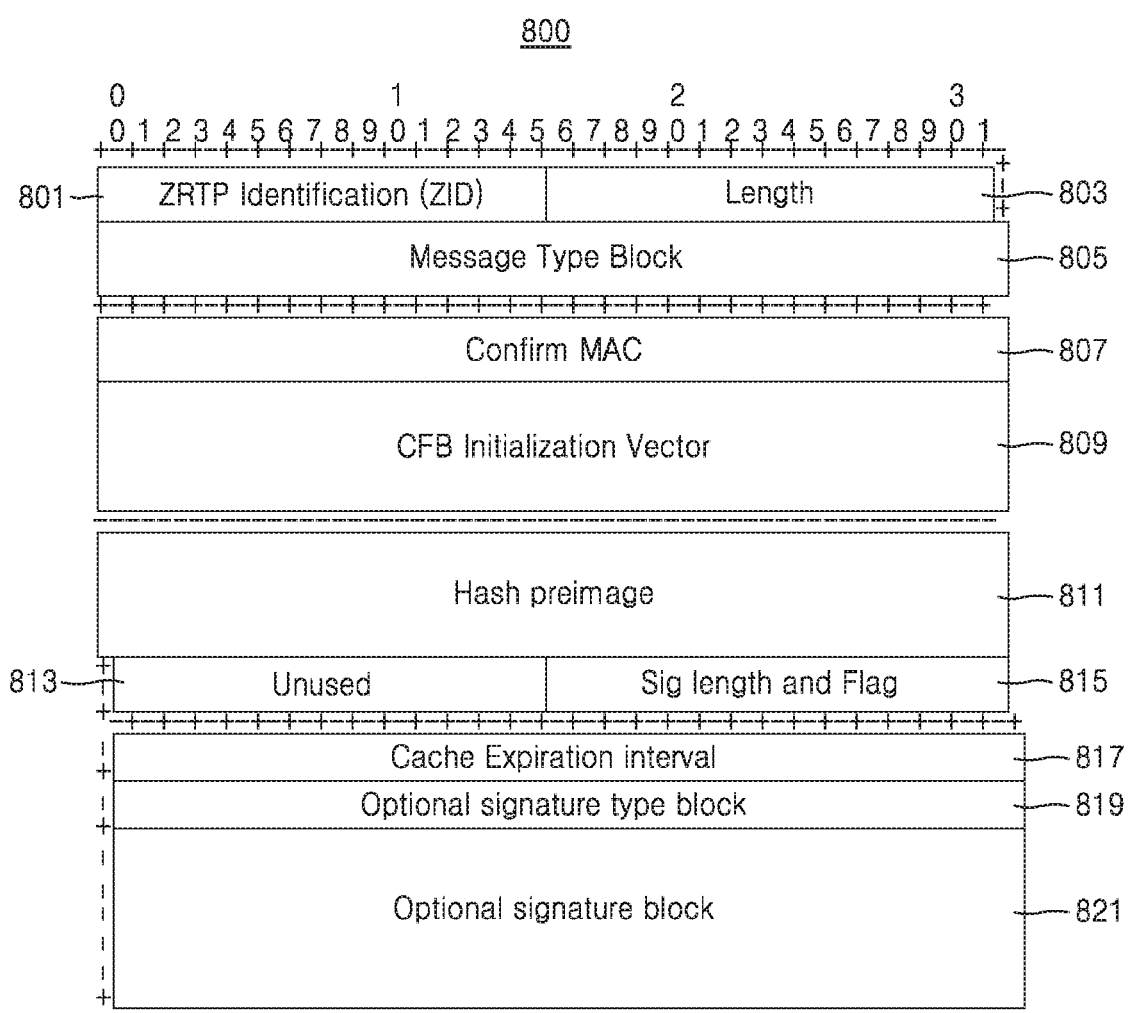
FIGS. 8 and 9 are diagrams for explaining a packet including encryption key data according to some embodiments.
Figure 9:
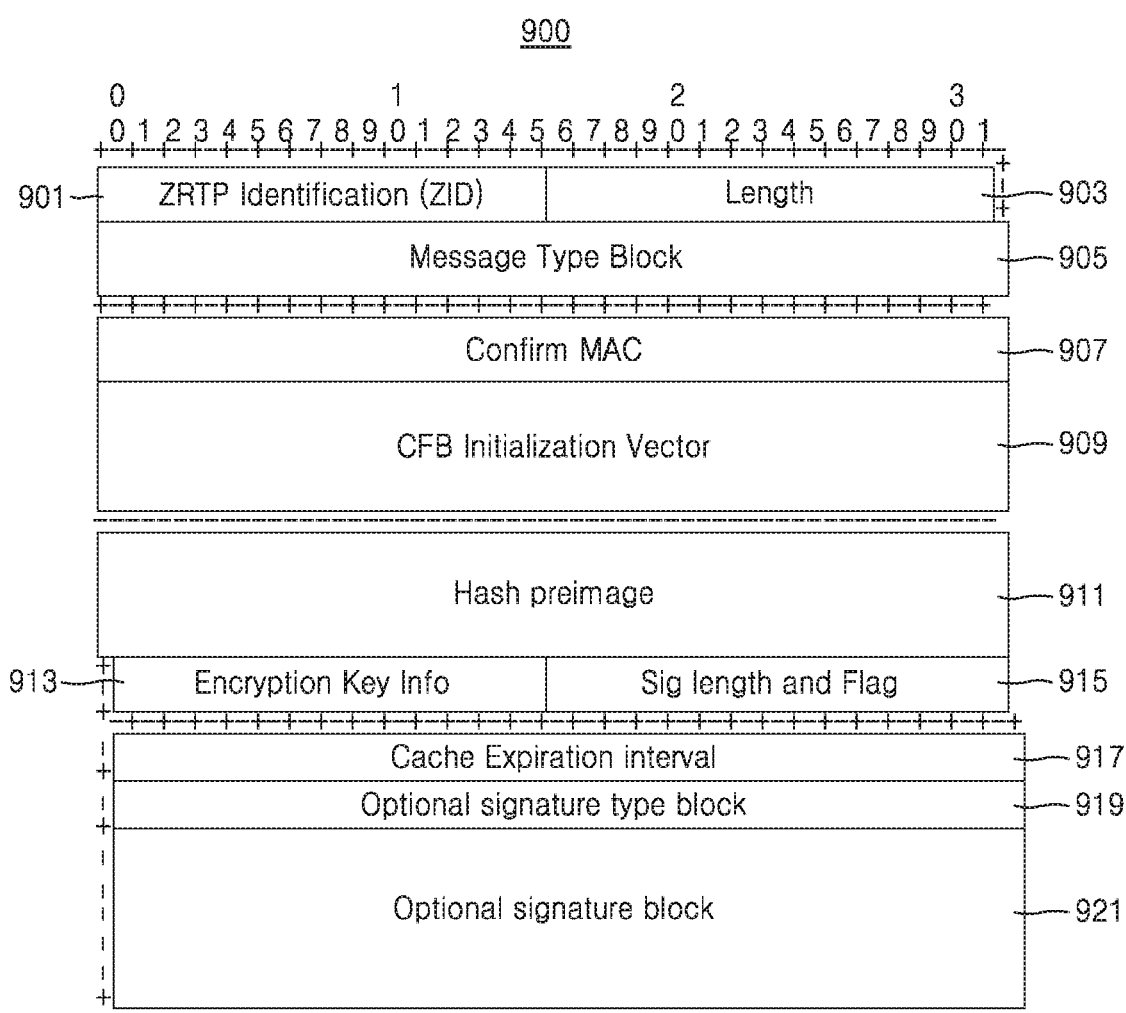

FIGS. 8 and 9 are diagrams for explaining a packet including encryption key data according to some embodiments.

FIG. 8 shows an example of a ZRTP confirm message. According to some embodiments, the ZRTP confirm message may include one of messages transmitted and received between a first device and a second device in a session establishment procedure for generating an encryption key of ZRTP. The entire procedure of session establishment for encryption of a communication session is described in detail in FIG. 10.

According to some embodiments, a ZRTP message 800 of FIG. 8 may include a ZRTP Identification field 801, a Length field 803, a Message Type Blcok field 805, a Confirm MAC field 807, a CFB Initialization Vector field 809, a Hash Preimage field 811, an Unused field 813, a Sig Length and Flag field 815, a Cache Expiration Interval field 817, an Optional Signature Type Block field 819, and an Optional Signature Block field 821 but is not limited to the above example, and may include a field that excludes some fields or includes additional information in message formats of the example according to an embodiment.

According to some embodiments, the ZRTP Identification field 801 may include information about a ZRTP identifier (ZID). The ZID identifier may include an identifier used in establishing a session for encrypting a communication session using ZRTP but is not limited to the above example, and may include all the identification information for identifying a device using ZRTP.

According to some embodiments, the Length field 803 may include information about a length of a packet including a confirm message.

According to some embodiments, the Message Type Blcok field 805 may include information to confirm whether a first device transmits a confirm message to a second device or the second device transmits the confirm message to the first device.

According to some embodiments, the Confirm MAC field 807 may include information (e.g., MACKEY) about a Message Authentication Code (MAC), which is a message authentication code of the confirm message.

According to some embodiments, the CFB Initialization Vector field 809 may include information about an initial vector value used in a CFB (Cipher Feedback) encryption algorithm, which is one type of a block encryption method.

According to some embodiments, the Hash Preimage field 811 is a type of a hash function, which may include information about a hash function that is resistant to a hash preimage attack.

According to some embodiments, the Unused field 813 may be an unused field that does not include predetermined information.

According to some embodiments, the Sig Length and Flag field 815 may include information about a signature and information about a length of the signature, and further includes a Private Branch Exchange (PBX) Enrollment flag, a Short Authentication String (SAS) authentication flag, Allow Clear Flag information, which is a flag used when switching from SRTP to RTP, and ZRTP Disclosure Flag, which is used as a back door of ZRTP. The information about the flags is obvious to a person skilled in the art, and thus a detailed description thereof is omitted.

According to some embodiments, the Cache Expiration Interval field 817 may include information that is shared between the first device and the second device, such as an interrupt when communication is not properly performed.

According to some embodiments, the Optional Signature Type Block field 819 and the Optional Signature Block field 821 may include information about the Signature key and signature value used to generate the signature.

It will be apparent to those skilled in the art that the information included in the field may include other information depending on the implementation.

FIG. 9 shows a ZRTP confirm message including encryption key information.

A ZRTP message 900 of FIG. 9 includes a ZRTP Identification field 901, a Length field 903, a Message Type Blcok field 905, a Confirm MAC field 907, a CFB Initialization Vector field 909, a Hash Preimage field 911, an Encryption Key Info field 913, a Sig Length and Flag field 915, a Cache Expiration Interval field 917, an Optional Signature Type Block field 919, and an Optional Signature Block field 921 but is not limited to the above example, and may include fields that exclude some fields or include additional information in a message format of the example according to an embodiment.

According to some embodiments, the ZRTP Identification field 901, the Length field 903, the Message Type Blcok field 905, the Confirm MAC field 907, the CFB Initialization Vector field 909, the Hash Preimage field 911, the Sig The Length and Flag field 915, the Cache Expiration Interval field 917, the Optional Signature Type Block field 919, and the Optional Signature Block field 921 correspond to those described in FIG. 8, and thus detailed descriptions thereof are omitted.

According to some embodiments, the Encryption Key Info field 913 may include information about an encryption key generated by a first device. As described above, the encryption key information may be at least a part of the encryption key.

According to some embodiments, the part of the encryption key may be reconstructed as an encryption key based on a key generation function (key generation algorithm). That is, even if a predetermined device obtains a part of the encryption key, if there is no key generation function, it may not generate the same encryption key as the encryption key generated by the first device.

Compared with FIG. 8, the Confirm message 900 of FIG. 9 is that the Unused field 813 in a ZRTP Confirm message is changed to an Encryption Key Info field. That is, the first device may support monitoring of a communication session between the first device and the second device by inserting and transmitting the encryption key information in a field not used in the ZRTP confirm message.

Also, according to some embodiments, by inserting the encryption key information into an unused bit in the ZRTP confirm message, monitoring of a communication session between devices using existing ZRTP may be supported without using a new protocol.

Figure 10:
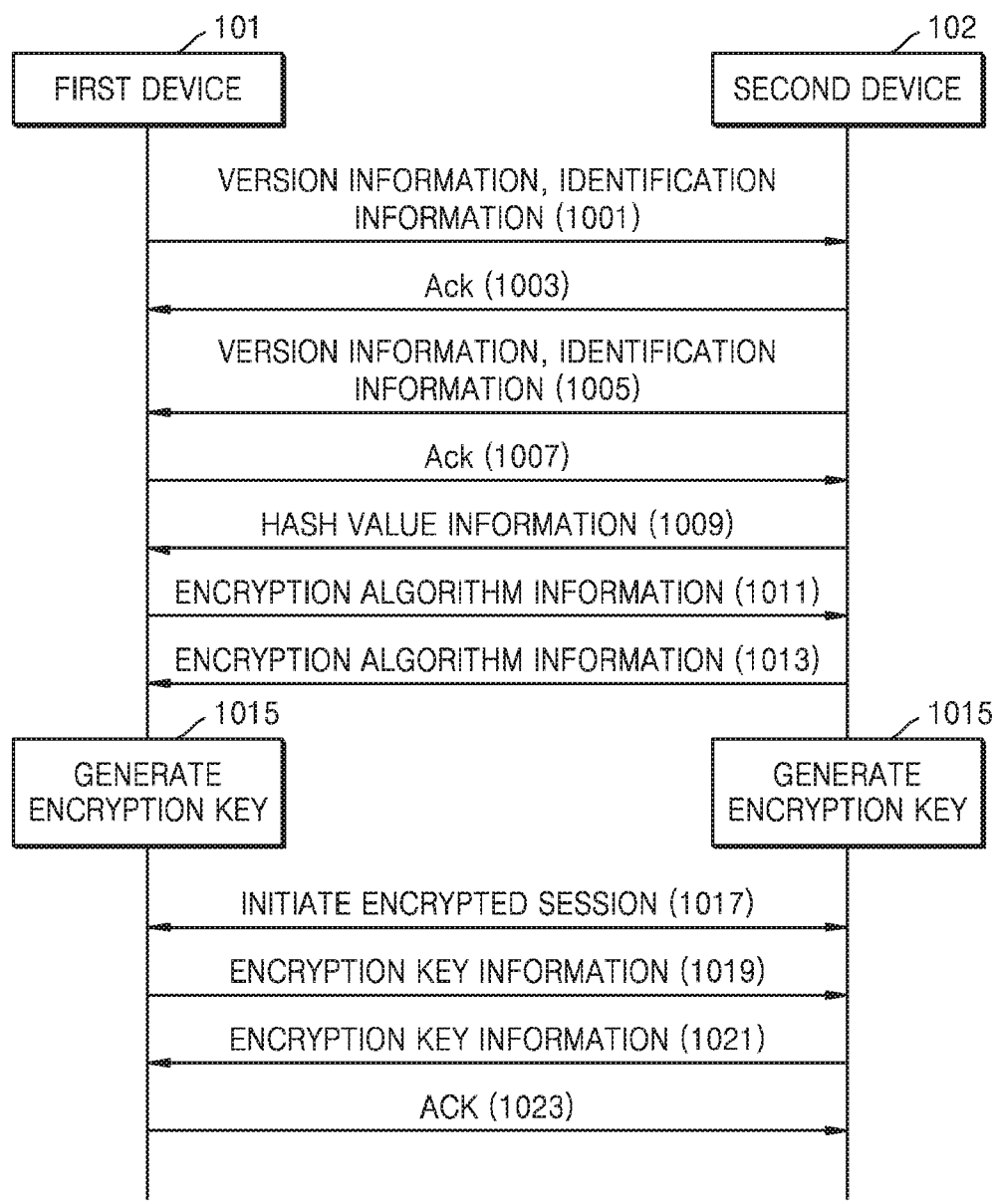
FIG. 10 is a diagram for explaining a method of generating an encryption key of a device according to some embodiments.

FIG. 10 is a diagram for explaining a method of generating an encryption key of a device according to some embodiments.

In step 1001, the first device 101 may transmit version information and device identification information to the second device 102.

According to some embodiments, the version information may include version information of a protocol used to encrypt a communication session between the first device 101 and the second device 102. For example, the version information may include version information of ZRTP, and is not limited to the above example.

According to some embodiments, the identification information may include information identifying a device in a session establishment step. For example, the identification information may include a ZRTP identifier (ZID) described in FIGS. 8 to 9, and is not limited to the above example.

In step 1003, the second device 102 may transmit an ACK (Acknowledge) signal to the first device 101. The ACK signal means that a signal transmitted by the first device 101 has been received, and it is obvious to those skilled in the art and thus, a detailed description thereof is omitted.

In step 1005, the second device 102 may transmit the version information and the identification information to the first device 101. Since the version information and the identification information correspond to those described in step 1001, detailed descriptions are omitted.

In step 1007, the first device 101 may transmit the ACK signal to the second device 102. Since this corresponds to that described in step 1003, a detailed description thereof is omitted.

In step 1009, the second device 102 may transmit hash value information to the first device 101.

According to some embodiments, the hash value information is a value generated using a hash function, and may include information for negotiating an encryption key algorithm before transmitting or receiving the encryption key algorithm. For example, the hash value may include has value of initiator (hvi), and is not limited to the above example.

Additionally, according to some embodiments, the second device 102 may transmit identification information of the second device 102 to the first device 101 along with the hash value information.

In step 1011, the first device 101 may transmit encryption key algorithm information to the second device 102. According to some embodiments, the information about the encryption algorithm may include a predetermined value that indicates an algorithm negotiated by the first device 101 and the second device 102. For example, when the first device 101 negotiates with the second device 102 to encrypt data using the Diffie-Hellman algorithm, the first device 101 may transmit a predetermined value representing the Diffie-Hellman algorithm to the second device 102. However, the present disclosure is not limited to the above example.

According to some embodiments, the encryption algorithm information may include pvr, which is a value obtained by calculating svr (DH secret value of the responder) with the predetermined value negotiated by the first device 101 and the second device 102. For example, pvr=g^svr mod p (where g and p are values negotiated by the first device 101 and the second device 102) but is not limited to the above example.

In step 1013, the second device 102 may transmit the encryption key algorithm information to the first device 101. The encryption key algorithm information may include pvi, which is a value obtained by calculating svi (DH secret value of the initiator) with the predetermined value negotiated by the first device 101 and the second device 101. For example, pvi=g^svi mod p (where g and p are values negotiated by the first device 101 and the second device 102) but is not limited to the above example.

In step 1015, the first device 101 and the second device 102 may generate an encryption key based on the encryption algorithm information transmitted and received in steps 1011 and 1013. The first device 101 and the second device 102 may generate the same encryption key or different encryption keys.

In step 1017, the first device 101 and the second device 102 may initiate an encryption session. That is, the first device 101 and the second device 102 may encrypt data using the encryption key generated in step 1015, and transmit the encrypted data.

In step 1019, the first device 101 may transmit the encryption key information to the second device 102. According to some embodiments, the first device 101 may determine whether the first device 101 has received a monitoring signal, and may transmit the encryption key information to the second device 102 based on a result of determination.

According to some embodiments, the first device 101 may insert and transmit the encryption key information into a predetermined packet. For example, the first device 101 may insert and transmit the encryption key information into a packet including a ZRTP confirm message to the second device 102 but is not limited to the above example.

According to some embodiments, the encryption key information may include at least a part of the encryption key. A third device may obtain the encryption key information by obtaining the packet transmitted from the first device 101 to the second device 102 and generate the same encryption key as the encryption key generated by the first device 101 based on the obtained encryption key information. The third device generate the same encryption key as the encryption key generated by the first device 101 and thus at least a part of data transmitted and received between the first device 101 and the second device 102 may be decrypted using the encryption key generated by the third device.

In step 1021, the second device 102 may transmit the encryption key information to the first device 101. If the encryption keys generated by the first device 101 and the second device 102 are identical, step 1019 or step 1021 may be omitted, depending on the implementation.

In step 1023, the first device 101 may transmit an ACK signal to the second device 102. Step 1023 may be omitted according to an implementation.

Figure 11:
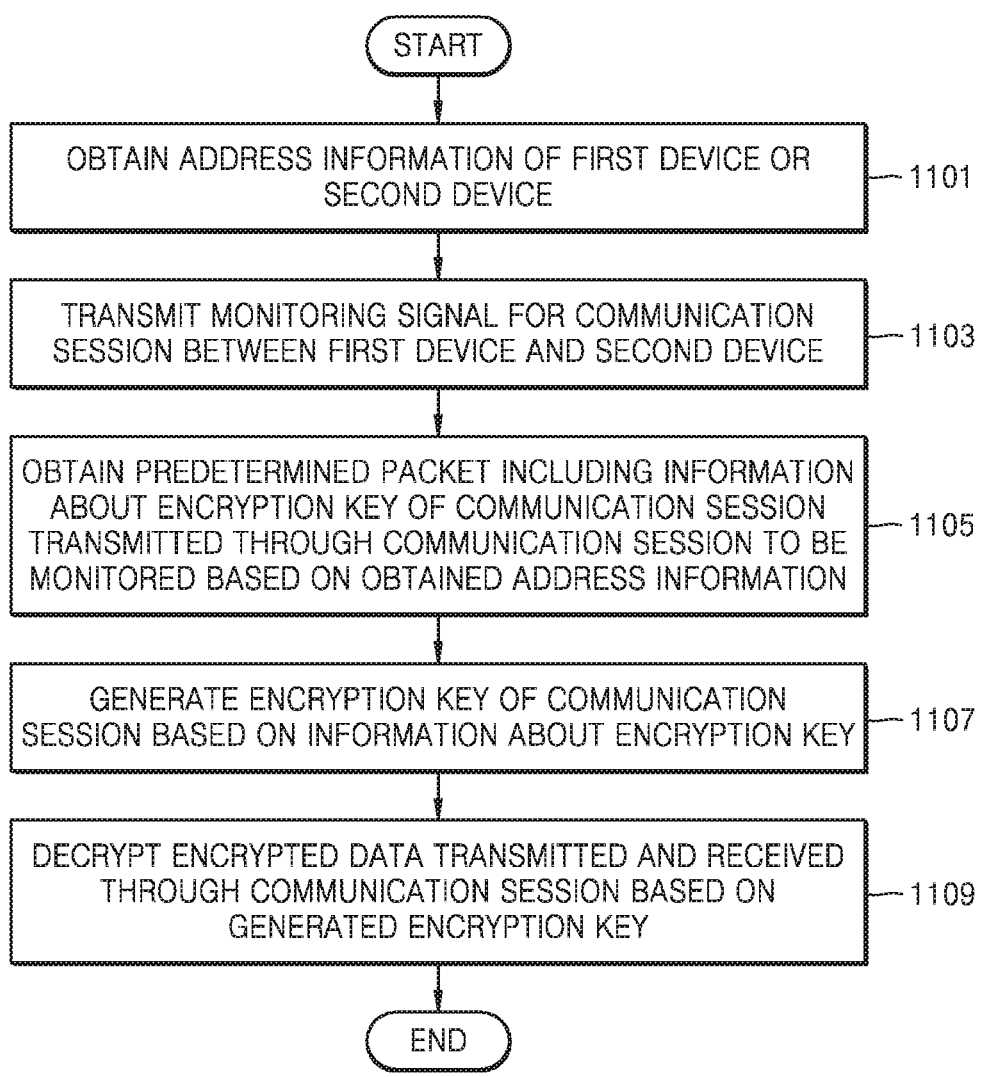
FIG. 11 is a flowchart illustrating a method of monitoring a communication session between a first device and a second device performed by a third device according to some embodiments.

FIG. 11 is a flowchart illustrating a method of monitoring a communication session between a first device and a second device performed by a third device according to some embodiments.

In step 1101, the third device may obtain address information of the first device or the second device. According to some embodiments, the third device may obtain at least one of the address information of the first device and the second device from a user input or from a server.

In step 1103, the third device may transmit a monitoring signal for the communication session between the first device and the second device. According to some embodiments, the third device may transmit the monitoring signal to the first device, or may transmit the monitoring signal to the second device. Of course, the third device may transmit the monitoring signal to both the first device and the second device. For example, the third device may determine a device to be monitored and transmit the monitoring signal to the device to be monitored according to a result of determination.

Also, according to some embodiments, the third device may transmit the monitoring signal to the first device or the second device via the server.

According to some embodiments, the third device may determine which content to monitor among at least one piece of content to be transmitted by the first device or the second device, and, according to a result of determination, transmit the monitoring signal including information about which content to monitor to the first device or the second device.

In step 1105, the third device may obtain a predetermined packet including information about an encryption key of the communication session transmitted through the communication session to be monitored based on the obtained address information.

According to some embodiments, the first device or the second device may transmit the encryption key information using a predetermined packet. The third device may obtain the encryption key information by intercepting the predetermined packet transmitted from the first device or the third device.

According to some embodiments, the third device may filter and intercept packets between the first device and the second device, thereby obtaining the predetermined packet including the encryption key information.

In step 1107, the third device may generate an encryption key of the communication session based on the information about the encryption key. According to some embodiments, the encryption key information may include at least a part of the encryption key but is not limited to the above example, and may include all information capable of generating the encryption key.

According to some embodiments, the third device may obtain a key generation function (key generation algorithm) for generating the encryption key based on the encryption key information from a manufacturer of the first device or a manufacturer of the second device. The third device may also obtain the key generation function from the server.

According to some embodiments, the key generation function may include a key operation function. For example, the third device may generate the same encryption key as the encryption key generated by the first device or the second device using the key operation function and the encryption key information. In other words, the third device may reconstruct the encryption key generated by the first device or the second device based on the obtained encryption key information.

In step 1109, the third device may decrypt encrypted data transmitted and received through the communication session based on the generated encryption key. According to some embodiments, the third device may obtain the encrypted packet transmitted and received through the communication session between the first device and the second device based on the address information of the first device or the second device, and decrypt the obtained encrypted packet.

For example, the third device may intercept the encrypted packet transmitted from the first device to the second device based on the address information of the first device, and decrypt the intercepted encrypted packet using the encryption key generated by the third device, thereby obtaining information included in data transmitted from the first device to the second device.

Figure 12:
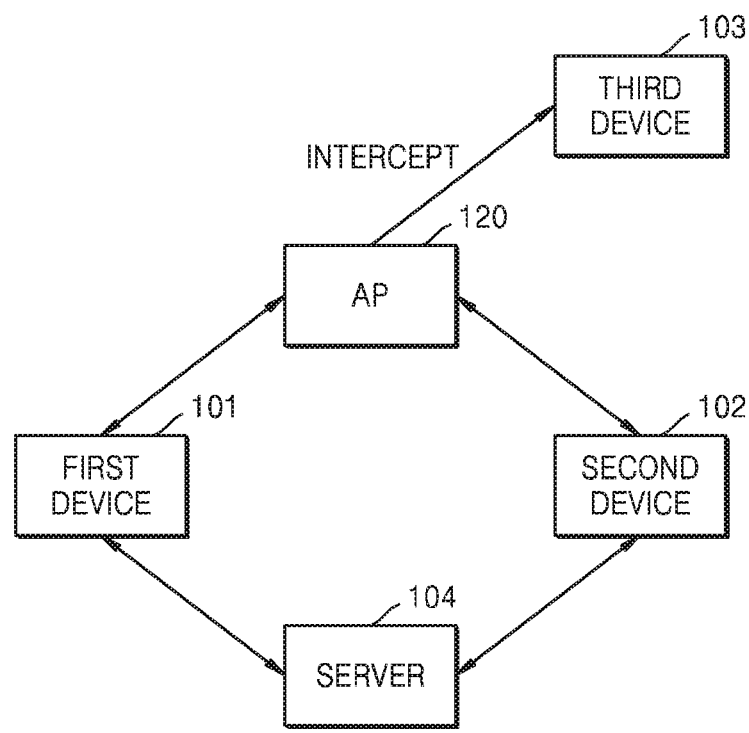
FIG. 12 illustrates a system for explaining a monitoring method according to some embodiments.

FIG. 12 illustrates a system for explaining a monitoring method according to some embodiments.

According to some embodiments, the server 104 may initiate a session between the first device 101 and the second device 102. For example, the server 104 that received a session initiation request of the second device 102 with the first device 101 may forward the session initiation request to the first device 101 based on database stored in the server 104. The first device 101 may receive the session initiation request and may perform session establishment to initiate an encrypted session via the server 104 or directly with the second device 102.

According to some embodiments, the session between the first device 101 and the second device 102 may be configured in a variety of ways. Referring to FIG. 12, a communication session between the first device 101 and the second device 102 may be configured as a path including one access point (AP) 120. The first device 101 may transmit data to the second device 102 via the AP 120.

According to some embodiments, the third device 103 may intercept data transmitted by the first device 101 when the data transmitted from the first device 101 to the second device 102 passes through the AP 120. According to some embodiments, the third device 103 may obtain address information of the first device 101 and filter packets passing through the AP 102 based on the address information of the first device 101, thereby obtaining a packet transmitted by the first device 101. The third device 103 may intercept the packet transmitted by the first device 101, obtain encryption key information transmitted by the first device, and monitor encrypted data (or packet).

Figure 13:
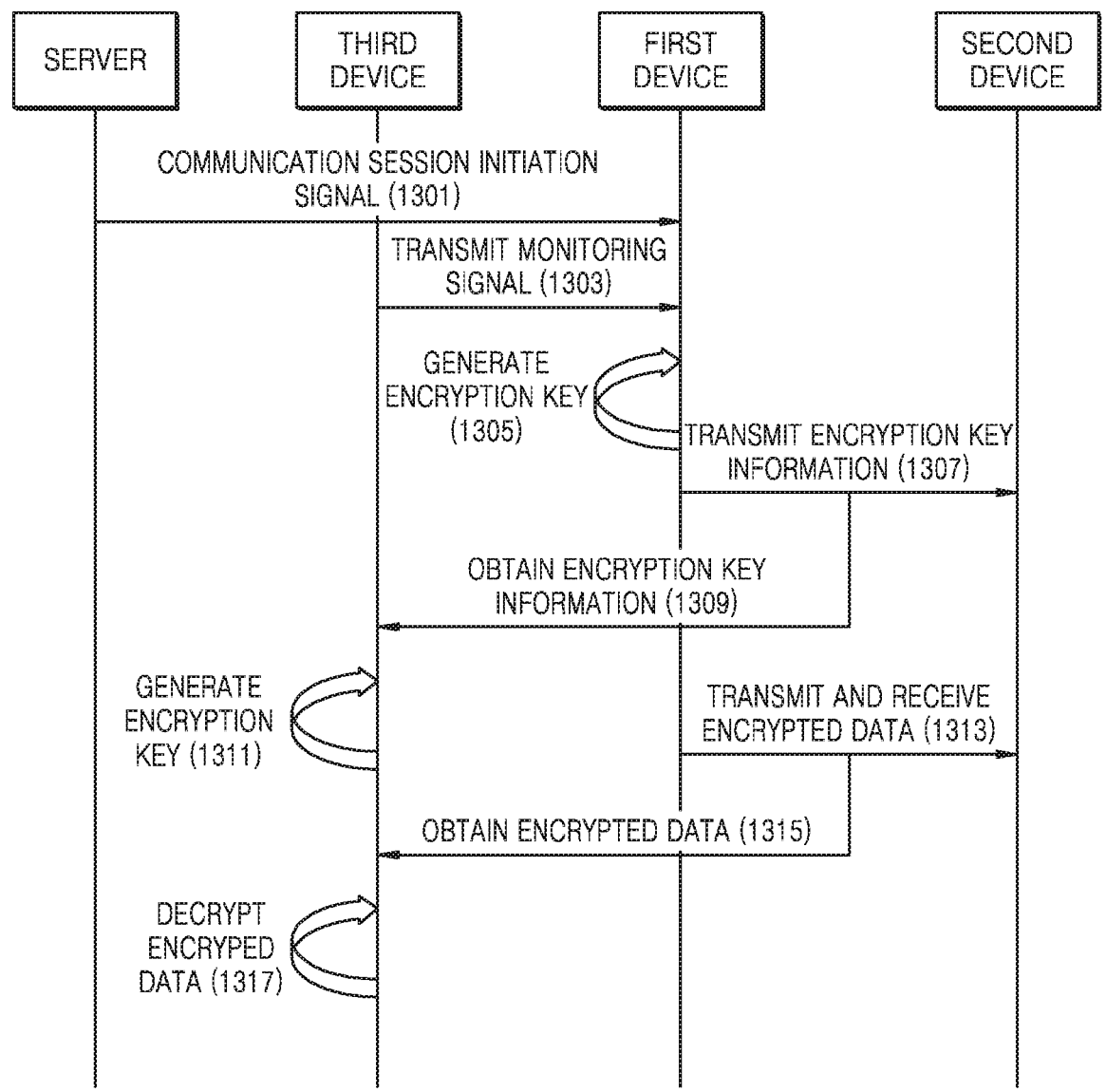
FIG. 13 shows a flowchart for explaining a monitoring support method according to some embodiments.

FIG. 13 shows a flowchart for explaining a monitoring support method according to some embodiments.

In step 1301, a server may transmit a communication session initiation signal to a first device. According to some embodiments, the server may forward a communication session initiation signal received from a second device to the first device.

In step 1303, a third device may transmit a monitoring signal to the first device. According to some embodiments, the third device may determine which content to monitor among at least one piece of content to be transmitted by the first device, and transmit the monitoring signal based on determination.

In step 1305, the first device may generate an encryption key. According to some embodiments, the first device may perform session establishment to encrypt a communication session with the second device, and may generate an encryption key based on a result of performing session establishment.

According to some embodiments, the first device may generate a different content key for each of at least one piece of content to transmit. The first device may also generate an encryption key different from the second device.

In step 1307, the first device may transmit encryption key information, which is information about the encryption key, to the second device. According to some embodiments, the first device may transmit at least a part of the encryption key.

According to some embodiments, the first device may transmit the encryption key information using a predetermined packet. For example, the predetermined packet may contain a ZRTP confirm message.

Also, according to some embodiments, the first device may identify content to be monitored based on the received monitoring signal, and may transmit information about an encryption key corresponding to the content to be monitored to the second device.

In step 1309, the third device may obtain information about the encryption key. According to some embodiments, the third device may obtain information about the encryption key transmitted by the first device based on the address information of the first device.

In step 1311, the third device may generate an encryption key. According to some embodiments, the third device may generate the encryption key information based on the information about the encryption key obtained in step 1309. Also, according to some embodiments, the third device may obtain a key generation function and generate encryption key information based on the obtained key generation function and the information about the obtained encryption key. That is, the third device may generate or reconstruct the same encryption key as the encryption key generated by the first device based on the key generation function and the encryption key information.

According to some embodiments, the third device may obtain the key generation function from a manufacturer of the first device or the second device, or by a user input. The third device may also obtain the key generation function from the server.

In step 1313, the first device may transmit and receive encrypted data with the second device. According to some embodiments, the first device may encrypt the data using the encryption key generated in step 1305 and transmit the encrypted data to the second device.

In step 1315, the third device may obtain the encrypted data. According to some embodiments, the third device may obtain the encrypted data transmitted from the first device to the second device based on the address information of the first device.

In step 1317, the third device may decrypt the encrypted data obtained in step 1315. According to some embodiments, the third device may decrypt at least a part of the encrypted data transmitted between the first device and the second device using the encryption key obtained in step 1311.

Figure 14:
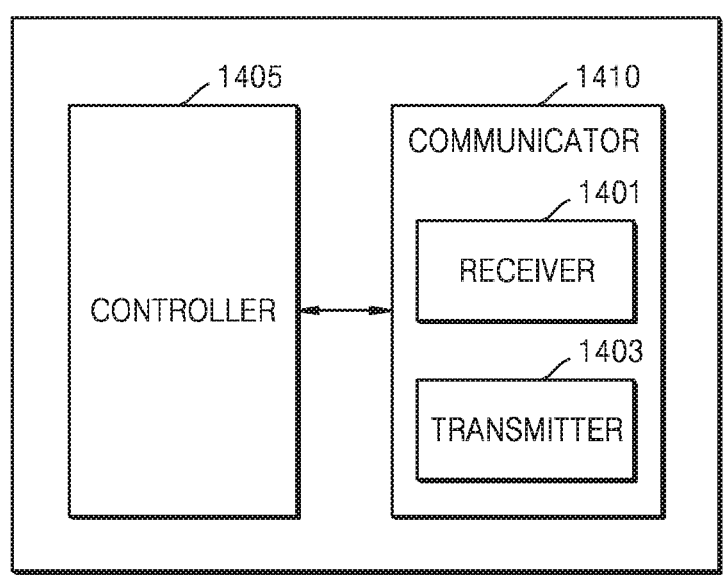
FIG. 14 is a diagram for explaining a device for supporting monitoring according to some embodiments.

FIG. 14 is a diagram for explaining a device for supporting monitoring according to some embodiments.

As shown in FIG. 14, the first device 101, which is a device supporting monitoring according to some embodiments, may include a communicator 1410 including a receiver 1401 and a transmitter 1403 and a controller 1405. However, all the components shown in FIG. 14 are not essential components of the first device 101. The first device 101 may be implemented by more components than the components shown in FIG. 14, or the first device 101 may be implemented by fewer components than those shown in FIG. 14. Also, according to some embodiments, the second device 102 described above may also have the same configuration as the first device 101.

According to some embodiments, the receiver 1401 may receive a communication session initiation signal with the second device 102. The receiver 1401 may receive the communication session initiation signal from a server or the second device 102.

According to some embodiments, the receiver 1401 may receive, from the second device 102, at least one of encryption protocol version information used to encrypt a communication session, an identifier that identifies the session with the second device 102, and information about encryption algorithm supported by the from the second device 102.

Also, according to some embodiments, the receiver 1401 may receive encrypted data from the second device 102. According to some embodiments, the encrypted data may include encrypted content.

According to some embodiments, the transmitter 1403 may transmit information about the encryption key to the second device 102 using a predetermined packet. The third device 103 may obtain the predetermined packet transmitted by the transmitter 1403, thereby obtaining information about the encryption key. The third device 103 that obtained the predetermined packet transmitted by the transmitter 1403 may also obtain the encryption key, thereby decrypting the encrypted data transmitted and received via the session between the first device 101 and the second device 102.

According to some embodiments, the transmitter 1403 may transmit, to the to the second device 102, encryption protocol version information used for encryption of the communication session, an identifier that identifies the session with the second device 102, and information about the encryption algorithm supported by the to the second device 102. According to some embodiments, the transmitter 1403 may transmit data encrypted with the encryption key to the second device 102.

Further, according to some embodiments, when encryption keys respectively corresponding to content are different, the transmitter 1403 may transmit information about an encryption key for the content that the third device 103 desires to monitor to the second device 102 using a predetermined packet based on a determination of the controller 1405.

According to some embodiments, the receiver 1401 and the transmitter 1403 may transmit with the second device 102 using ZRTP. Also, the predetermined packet used by the transmitter 1403 to transmit the encryption key information may include a packet including a ZRTP confirm message. Also, the information about the encryption key may be at least a part of the encryption key.

According to some embodiments, the communicator 1410 may further include a signal obtainer (not shown) for obtaining a monitoring signal from the third device 103. The receiver 1401 may obtain the monitoring signal from the third device 103 according to an embodiment.

According to some embodiments, the controller 1405 typically controls the overall operation of the first device 101. For example, the controller 1405 may generally control the components included in the first device 101 by executing a program stored in the first device 101. Also, the controller 1405 may include at least one processor.

According to some embodiments, the controller 1405 may generate an encryption key for encryption of a communication session with the second device 102, and may determine whether to receive monitoring for the communication session. The controller 1405 may generate the encryption key based on at least one of encryption algorithm of the first device 101 and the second device 102, a public key of the communication session between the first device 101 and the second device 102, and a private key of the first device 101.

According to some embodiments, the controller 1405 may generate an encryption key that is different from the encryption key generated by the second device 102. Also, the controller 1405 may generate an encryption key for each of at least one piece of content to be transmitted by the first device 101. That is, the controller 1405 may generate the encryption key corresponding to each of the at least one piece of content, in order to encrypt each of the at least one piece of content to be transmitted by the first device 101 using a different encryption key.

According to some embodiments, the controller 1405 may determine encryption algorithm for generating an encryption key based on encryption protocol version information, which is received by the first device 1401 from the second device 102, used to encrypt the communication session, the identifier that identifies the session with the second device 102, and the information about encryption algorithm supported by the from the second device 102 and generate the encryption key using the determined encryption algorithm.

Figure 15:
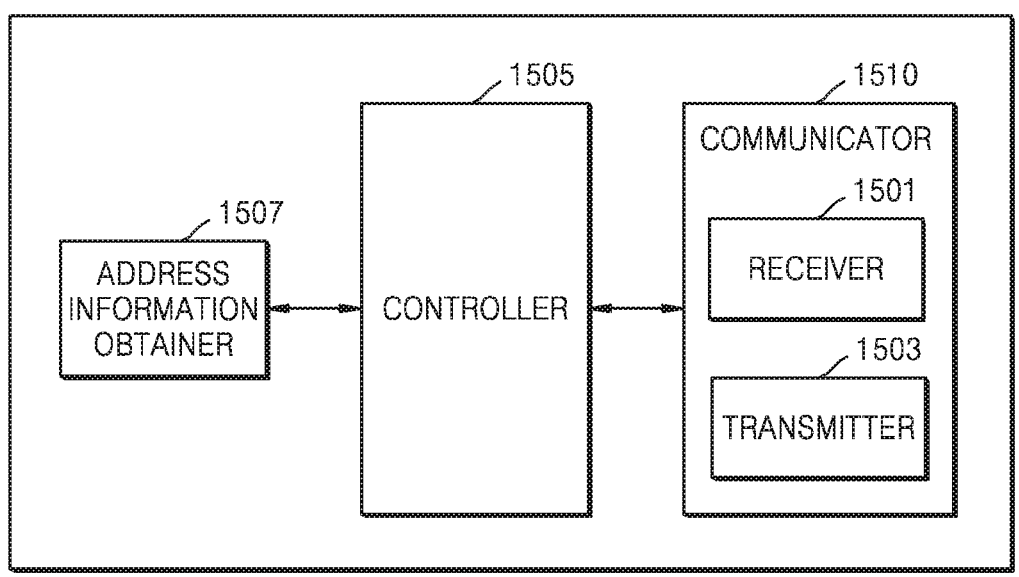
FIG. 15 is a diagram for explaining a device that performs monitoring according to some embodiments.

FIG. 15 is a diagram for explaining a device that performs monitoring according to some embodiments.

As shown in FIG. 15, the third device 103, which is a device for performing monitoring according to some embodiments, may include a communicator 1510 including a receiver 1501 and a transmitter 1503, a controller 1505, and an address information obtainer 1507. However, all the components shown in FIG. 15 are not essential components of the third device 103. The third device 103 may be implemented by more components than the components shown in FIG. 15 and the third device 103 may be implemented by fewer components than those shown in FIG. 15.

According to some embodiments, the receiver 1501 may obtain a predetermined packet including information about an encryption key of a communication session transmitted through a communication session between the first device 101 and the second device 102, which is a communication session to be monitored based on address information of the first device 101 or the second device 102.

Also, according to some embodiments, the receiver 1401 may obtain encrypted data that is transmitted and received via the communication session between the first device 101 and the second device 102.

As described above, the meaning that the receiver 1401 obtains data may include a meaning of intercepting a packet. For example, even if the third device 103 is not determined as a final destination of the packet, the third device 103 may obtain the packet through interception.

According to some embodiments, the receiver 1401 may obtain all packets through a predetermined path and filter the obtained packets on the basis of the address information of the first device 101 or second device 102, thereby obtaining data transmitted and received between the device 101 and the second device 102.

Also, according to some embodiments, the receiver 1401 may obtain a list of at least one piece of content to be transmitted or received over the communication session between the first device 101 and the second device 102 from the first device 101, the second device 102, or a server.

According to some embodiments, the transmitter 1403 may transmit a monitoring signal to the first device 101 or the second device 102. According to some embodiments, the transmitter 1403 may transmit the monitoring signal only to the first device 101 or the second device 102 to be monitored. The transmitter 1403 may also select content to be monitored among the at least one piece of content to be transmitted or received through the communication session between the first device 101 and the second device 102 and transmit a monitoring signal including information about the selected content.

According to some embodiments, the controller 1505 may generally control the overall operation of the third device 103. For example, the controller 1505 may control overall components included in the third device 103 by executing a program stored in the third device 103. The controller 1505 may also include at least one processor.

According to some embodiments, the controller 1505 may generate an encryption key based on encryption key information obtained through the receiver 1501. According to some embodiments, the encryption key generated by the controller 1505 may be the same as the encryption key generated by the first device 101 or the second device 102. That is, the controller 1505 may reconstruct the encryption key generated by the first device 101 or the second device 102 based on the obtained encryption key information.

According to some embodiments, the controller 1505 may decrypt encrypted data transmitted and received through the communication session based on the generated encryption key. According to some embodiments, the controller 155 may obtain the encrypted data transmitted and received through the communication session between the first device 101 and the second device 102 obtained by the receiver 1501 and may decrypt the obtained encrypted data.

According to some embodiments, the controller 1505 may generate or reconstruct an encryption key using key generation algorithm (or a key generation function) obtained by a manufacturer of the server, the first device 101 or the second device 102 or by a separate user input and the obtained encryption key information.

Figure 16:
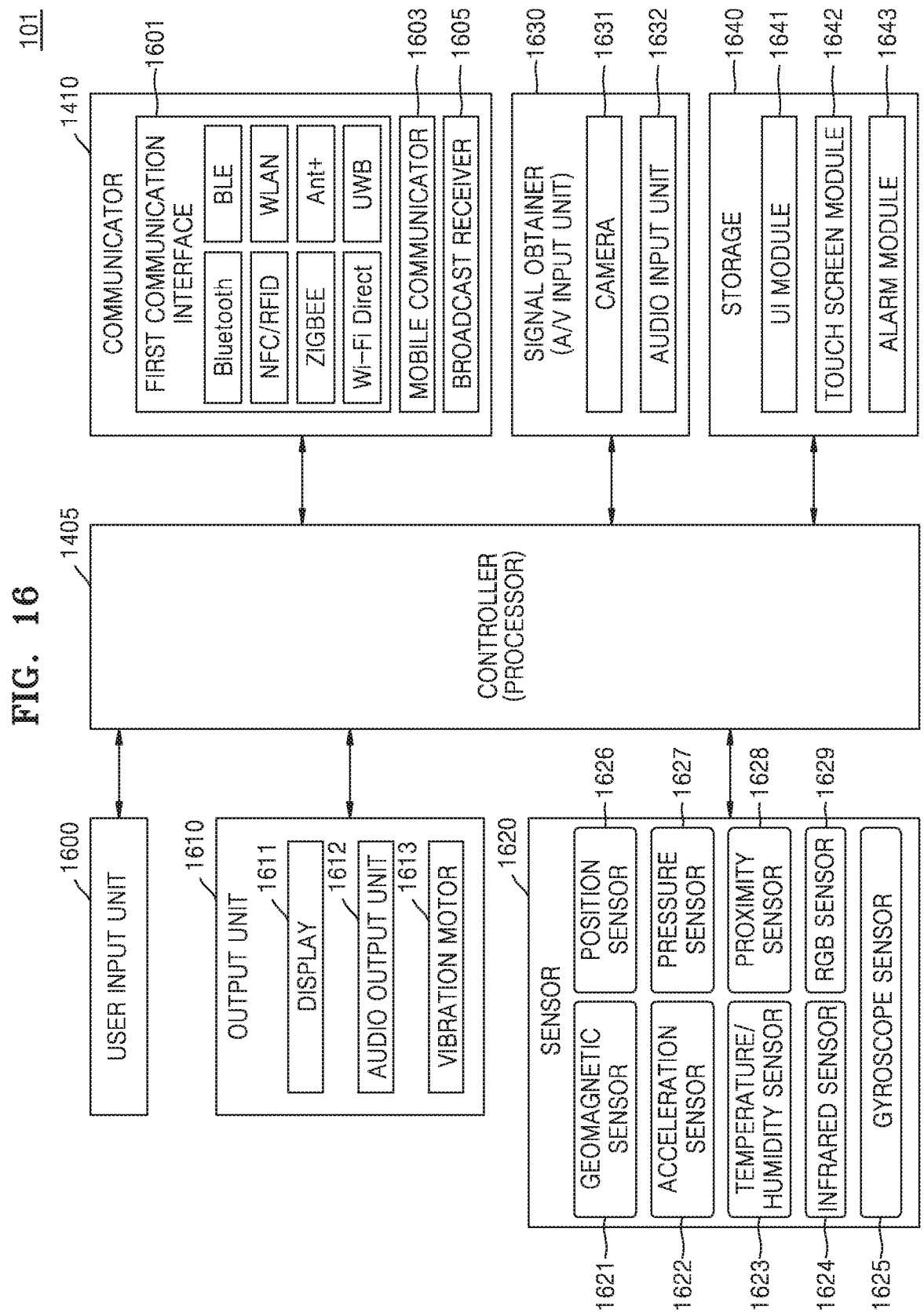
FIG. 16 is a detailed block diagram for explaining a device that supports monitoring according to some embodiments.

FIG. 16 is a detailed block diagram for explaining a device that supports monitoring according to some embodiments.

As shown in FIG. 16, the first device 101 which is a device supporting monitoring according to some embodiments may further include a user input unit 1600, an output unit 1610, a sensor 1620, an A/V input unit 1630, and a storage (memory) 1640, in addition to the communicator 1410 including the receiver 1401 and the transmitter 1403 and the controller 1405. However, all the components shown in FIG. 16 are not essential components of the first device 101. The first device 101 may be implemented by more components than the components shown in FIG. 16, or the first device 101 may be implemented by fewer components than those shown in FIG. 16. Also, according to some embodiments, the second device 102 described above may also have the same configuration as the first device 101.

An operation of the controller 1405 corresponds to that described above, and thus a detailed description thereof is omitted.

According to some embodiments, the communicator 1410 may include a short-range communicator 1601, a mobile communicator 1603, and a broadcast receiver 1605. The short-range communicator 1601 may include a Bluetooth communicator, a Bluetooth Low Energy (BLE) communicator, a Near field Communication (NFC) unit, a WLAN (WiFi) communicator, a Zigbee communicator, an infrared data association (IrDA) communicator, a Wi-Fi Direction (WFD) communicator, an Ultra WideBand (UWB) communicator, and an Ant+ communicator, but is not limited thereto.

In addition, each communicator included in the short-range communicator 1601 may include a transmitter and a receiver as described in FIG. 14. The Bluetooth communicator may include a Bluetooth transmitter and a Bluetooth receiver but is not limited to the above example.

According to some embodiments, the mobile communicator 1603 transmits and receives a wireless signal to and from with at least one selected from a base station, an external terminal, and a server on a mobile communication network. The wireless signal may include a voice call signal, a video call signal, or various types of data according to text/multimedia message transmission/reception.

The broadcast receiver 1605 receives broadcasting signals and/or broadcasting-related information via a broadcasting channel. The broadcasting channel may include a satellite channel and a terrestrial broadcast channel. According to various embodiments, the first device 101 may not include the broadcast receiver 1605. An operation of the communicator 1410 corresponds to that described above, and thus a detailed description thereof is omitted.

According to one or more embodiments, the storage (memory) 1640 may store a program for processing and controlling the controller 1405, and may store data to be input to the first device 101 or output from the first device 101.

According to one or more embodiments, the storage (memory) 1640 may include a storage medium of at least one type of a flash memory type, a hard disk type, a multimedia card type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

According to some embodiments, the programs, stored in the storage (memory) 1640, may be classified into a plurality of modules according to functions. For example, the programs may be classified into a User Interface (UI) module 1641, a touch screen module 1642, and an alarm module 1633.

The UI module 1641 may provide a specialized UI or GUI which interworks with the first device 101. For example, the UI module 1641 may provide a UI or GUI indicating if the first device 101 performs session establishment with the second device 102 or if the first device 101 transmits encrypted data to the second device 102.

The touch screen module 1642 may detect a touch gesture on a touch screen by a user and transmit information about the touch gesture to the controller 1405. According to some embodiments, the touch screen module 1642 may recognize and analyze touch codes. The touch screen module 1642 may be implemented with separate hardware including a controller.

Various types of sensors may be disposed inside or near the touch screen, in order to detect a touch or a proximity touch on the touch screen. An example of a sensor for detecting a touch on the touch screen may be a tactile sensor. The tactile sensor is a sensor for detecting a contact of a specific object to such a degree that humans may feel the contact with the specific object or to a higher degree. The tactile sensor may detect various types of information such as information about a roughness of a contact surface, a hardness of a contact object, a temperature at a contact point, etc.

Additionally, an example of a sensor for detecting a touch on the touch screen is a proximity sensor.

The proximity sensor refers to a sensor that detects the presence or absence of an object approaching a predetermined detection surface or an object existing near the sensor by an electromagnetic force or infrared light, without mechanical contact. Examples of the proximity sensor includes a transmission-type photoelectric sensor, a direct reflection-type photoelectric sensor, a mirror reflection-type photoelectric sensor, a radio frequency oscillation-type proximity sensor, an electrostatic capacitance type proximity sensor, a magnetic-type proximity sensor, an infrared proximity sensor. Touch gestures of a user may include a tap, a touch and hold, a double-tap, a drag, panning, a flick, a drag-and-drop, a swipe, etc.

The alarm module 1643 outputs a signal for notifying an event occurrence of the first device 101. Examples of events occurring in the first device 101 include a call signal reception, a message reception, a key signal input, and a schedule notification. The alarm module 1643 may output an alarm signal in a form of a video signal via a display 1611 or in a form of an audio signal via the audio output unit 1612. The alarm module 1643 may also output an alarm signal in a form of a vibration signal via the vibration motor 1613.

According to one or more embodiments, the user input unit 1600 is a unit through which data for controlling the first device 101 is input by the user. For example, the user input unit 1600 may include a keypad, a dome switch, a touch pad (a touch capacitive-type touch pad, a pressure resistive-type touch pad, an infrared beam-sensing-type touch pad, a surface acoustic wave-type touch pad, an integral strain gauge type touch pad, a piezoelectric effect-type touch pad, or the like), a jog wheel, and a jog switch, but is not limited thereto.

The output unit 1610 may output an audio signal, a video signal, or a vibration signal, and may include the display 1611, an audio output unit 1612, and a vibration motor 1613.

The display 1611 may display information processed by the first device 101.

In addition, in a case where the display 1611 and a touch pad form a layered structure to correspond to a touch screen, the display 1611 may also be used as an input device as well as an output unit. The display 1611 may include at least one from among a Liquid Crystal Display (LCD), a Thin-Film Transistor-Liquid Crystal Display (TFT-LCD), an Organic Light-Emitting Diode (OLED), a flexible display, a three-dimensional (3D) display, and an electrophoretic display. In addition, according to implementations of the first device 101, the first device 101 may include two or more displays 1611. The two or more displays 1611 may be disposed facing each other by a hinge.

The audio output unit 1612 outputs audio data which may be transmitted from the communicator 1410 or stored in the storage (memory) 1640. In addition, the audio output unit 1612 outputs an audio signal related to functions performed at the first device 101 such as, for example, a call signal reception sound, a message reception sound, and an alarm sound. The audio output unit 1612 may include a speaker, a buzzer, etc.

The vibration motor 1613 may output a vibration signal. For example, the vibration motor 1613 may output a vibration signal which corresponds to an output of audio data or video data such as, for example, a call signal reception sound, a message reception sound, etc. Additionally, the vibration motor 1613 may output a vibration signal, if a touch is input to a touch screen.

According to some embodiments, the sensor 1620 may detect a status of the first device 101 or a status of a periphery of the first device 101, and transmit the sensing information to the controller 1405.

The sensor 1620 may include at least one selected from a geomagnetic sensor 1621, an acceleration sensor 1622, a temperature/humidity sensor 1623, an infrared sensor 1624, a gyroscope sensor 1625, a position sensor (for example, GPS) 1626, a pressure sensor 1627, a proximity sensor 1628, and an RGB sensor 1629, but is not limited thereto. Additionally, since the functions of the respective sensors may be intuitively inferred from their names, a detailed description thereof is omitted.

The A/V input unit 1620 functions to input audio or video signals, and may include a camera 1631 and an audio input unit 1632. The camera 1631 may obtain an image frame such as a still picture or a moving picture through an image sensor, in a video phone mode or a photographing mode. An image captured through the image sensor may be processed through the controller 1405 or an additional image processing unit (not illustrated).

The image frame processed in the camera 1631 may be stored in the storage (memory) 1640, or transmitted to outside through the communicator 1410. The AN input unit 1620 may include two or more cameras 1631 according to a configuration type of the terminal.

The audio input unit 1632 receives external sound signals and processes the external sound signals into electrical voice data. For example, the audio input unit 1952 may be a microphone, but is not limited thereto.

The audio input unit 1632 may receive audio signals from an external device, the server, or the user. The audio input unit 1632 may use various noise removal algorithms for removing noise generated in the process of receiving external audio signals.

The apparatus according to one or more embodiments may include a processor, a memory storing and executing program data, a permanent storage such as a disk drive, a communication port communicating with an external device, and a user interface device such as a touch panel, a key, and a button. Methods implemented as software modules or algorithms may be stored as non-transitory computer readable codes on a computer readable recording medium. The non-transitory computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). The media may also be a distributed network, so that the non-transitory computer readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but may include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein may be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those of ordinary skill in this art without departing from the spirit and scope of this disclosure.

The invention claimed is:

1. A method of supporting monitoring by a third device of an encrypted data communication session of a first device, the method comprising:
receiving, by the first device, a signal for initiating a communication session with a second device;
generating a first encryption key for encryption of the communication session;
determining, by the first device, whether a monitoring signal is received for the communication session;
inserting information about the first encryption key into a predetermined packet, in response to determining that the monitoring signal is received; and
transmitting the predetermined packet to the second device,
wherein the information inserted in the predetermined packet is intercepted by the third device, in order for the third device to monitor the communication session of the first device with the second device,
wherein generating the first encryption key comprises generating different encryption keys for each of different pieces of content transmitted and received via the communication session,
wherein the monitoring signal includes information about content to be monitored among the different pieces of content, and the inserted information about the first encryption key comprises information about the first encryption key corresponding to the content to be monitored, determined based on the monitoring signal,
wherein the first encryption key corresponds to a second encryption key generated, by the third device, based on the information about the first encryption key, and
wherein the second encryption key is only used, by the third device, to decrypt data transmitted from the first device to the second device.

2. The method of claim 1, wherein generating the first encryption key comprises generating the first encryption key based on at least one of an encryption algorithm of the first device and the second device, a public key of the communication session, and a private key of the first device.

3. The method of claim 1, wherein generating the first encryption key comprises generating the first encryption key to be different from another encryption key generated by the second device.

4. The method of claim 1, wherein the predetermined packet comprises a composed of Z and Realtime Transport Protocol (ZRTP) confirm message.

5. The method of claim 1, wherein generating the first encryption key comprises:
receiving, from the second device, encryption protocol version information used for encryption of the communication session, an identifier for identifying the communication session with the second device, and information about an encryption algorithm supported by the second device;
determining an encryption algorithm for generating the first encryption key based on the received information; and
generating the first encryption key by using the determined encryption algorithm.

6. A first device for supporting a third device monitoring an encrypted data communication session, the first device comprising:
a transceiver configured to receive a signal for initiating a communication session with a second device; and
a controller configured to:
generate a first encryption key for encryption of the communication session,
determine whether a monitoring signal is received for the communication session,
insert information about the first encryption key into a predetermined packet, in response to determining that the monitoring signal is received, and
control the transceiver to transmit the predetermined packet to the second device,
wherein the information inserted in the predetermined packet is intercepted by the third device, in order for the third device to monitor the communication session of the first device with the second device,
wherein the controller is further configured to:
generate different encryption keys for each of different pieces of content transmitted and received via the communication session,
wherein the monitoring signal includes information about content to be monitored among the different pieces of content, and the inserted information about the first encryption key comprises information about the first encryption key corresponding to the content to be monitored, determined based on the monitoring signal,
wherein the first encryption key corresponds to a second encryption key generated, by the third device, based on the information about the first encryption key, and
wherein the second encryption key is only used, by the third device, to decrypt data transmitted from the first device to the second device.

7. The first device of claim 6, wherein the controller is further configured to:
receive, from the second device, encryption protocol version information used for encryption of the communication session, an identifier for identifying a session with the second device, and information about an encryption algorithm supported by the second device,
determine an encryption algorithm for generating the first encryption key based on the received information, and
generate the first encryption key by using the determined encryption algorithm.

8. A third device for monitoring an encrypted data communication channel between a first device and a second device, the third device comprising:
a transceiver; and
a controller configured to:
obtain address information of the first device or the second device,
transmit, via the transceiver, a monitoring signal for a communication session between the first device and the second device;
intercept a predetermined packet including information about a first encryption key based on the obtained address information, and
generate a second encryption key based on the information about the first encryption key and decrypt encrypted data transmitted and received through the communication session based on the generated second encryption key,
wherein the controller is further configured to determine which content to monitor among different pieces of content,
wherein the monitoring signal includes information about content to be monitored among the different pieces of content, and the first encryption key corresponds to the content to be monitored determined based on the monitoring signal, and
wherein the second encryption key corresponds to the first encryption key, and the third device decrypts only data transmitted from the first device to the second device based on the generated second encryption data.

9. A non-transitory computer-readable recording medium having recorded thereon a program, which when executed, controls a first device to perform a method of supporting a third device monitoring an encrypted data communication session, the method comprising:
receiving, by the first device, a signal for initiating a communication session with a second device;
generating a first encryption key for encryption of the communication session;
determining, by the first device, whether a monitoring signal is received for the communication session;
inserting information about the first encryption key into a predetermined packet, in response to determining that the monitoring signal is received; and
transmitting the predetermined packet to the second device,
wherein the information inserted in the predetermined packet is intercepted by the third device, in order for the third device to monitor the communication session of the first device with the second device,
wherein generating the first encryption key comprises generating different encryption keys for each of different pieces of content transmitted and received via the communication session,
wherein the monitoring signal includes information about content to be monitored among the different pieces of content, and the inserted information about the first encryption key comprises information about the first encryption key corresponding to the content to be monitored, determined based on the monitoring signal,
wherein the first encryption key corresponds to a second encryption key generated, by the third device, based on the information about the first encryption key, and wherein the second encryption key is only used, by the third device, to decrypt data transmitted from the first device to the second device.

10. A method of monitoring, by a third device, an encrypted communication session between a first device and a second device, the method comprising:
- obtaining, by the third device, address information of the first device or the second device;
- transmitting, by the third device, a monitoring signal for a communication session between the first device and the second device;
- intercepting, by the third device, a predetermined packet including information about a first encryption key, based on the obtained address information;
- generating, by the third device, a second encryption key based on the information about the first encryption key;
- decrypting encrypted data transmitted and received through the communication session based on the generated second encryption key; and
- determining which content to monitor among different pieces of content,
- wherein the monitoring signal includes information about content to be monitored among the different pieces of content, and the first encryption key corresponds to the content to be monitored, determined based on the monitoring signal, and
- wherein the second encryption key corresponds to the first encryption key, and the third device decrypts only data transmitted from the first device to the second device based on the generated second encryption data.

* * * * *